US012789102B2

(12) United States Patent
Ye et al.

(10) Patent No.: US 12,789,102 B2
(45) Date of Patent: Nov. 10, 2026

(54) EXPRESSION DISPLAY METHOD AND APPARATUS IN VIRTUAL SCENE, DEVICE AND MEDIUM

(71) Applicant: TENCENT TECHNOLOGY (SHENZHEN) COMPANY LIMITED, Shenzhen (CN)

(72) Inventors: Bo Ye, Shenzhen (CN); Peicheng Liu, Shenzhen (CN); Shan Lin, Shenzhen (CN); Zijian Wang, Shenzhen (CN); Kai Tang, Shenzhen (CN); Zibi Ding, Shenzhen (CN); Suiting Lin, Shenzhen (CN); Xiaohao Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 462 days.

(21) Appl. No.: 18/450,718

(22) Filed: Aug. 16, 2023

(65) Prior Publication Data

US 2023/0390650 A1 Dec. 7, 2023

Related U.S. Application Data

(63) Continuation of application No. PCT/CN2022/110870, filed on Aug. 8, 2022.

(30) Foreign Application Priority Data

Aug. 25, 2021 (CN) ......................... 202110981209.0

(51) Int. Cl.

| | |
|---|---|
| ***A63F 13/87*** | (2014.01) |
| ***A63F 13/5375*** | (2014.01) |
| ***A63F 13/847*** | (2014.01) |

(52) U.S. Cl.

CPC .......... *A63F 13/87* (2014.09); *A63F 13/5375* (2014.09); *A63F 13/847* (2014.09); *A63F 2300/5553* (2013.01)

(58) Field of Classification Search

CPC .... A63F 13/87; A63F 13/5375; A63F 13/847; A63F 2300/5553

(Continued)

(56) References Cited

U.S. PATENT DOCUMENTS

| | | | | |
|---|---|---|---|---|
| 8,601,379 B2 * | 12/2013 | Marks | A63F 13/42 | 715/706 |
| 2008/0102950 A1 * | 5/2008 | Ishii | A63F 13/58 | 463/31 |

(Continued)

FOREIGN PATENT DOCUMENTS

| | | |
|---|---|---|
| CN | 107707452 A | 2/2018 |
| CN | 109871165 A | 6/2019 |

(Continued)

OTHER PUBLICATIONS

Apex Legends Wiki: Holospray; https://apexlegends.wiki.gg/wiki/Holospray (Year: 2020).*

(Continued)

*Primary Examiner* — Allen Chan

(74) *Attorney, Agent, or Firm* — ANOVA LAW GROUP, PLLC

(57) ABSTRACT

An expression display method in a virtual scene includes: displaying a virtual scene with a controlled virtual object displayed in the virtual scene; displaying a first expression corresponding to a first interaction event in the virtual scene in response to that the first interaction event happens in the virtual scene, the first interaction event being an interaction event associated with a first virtual object, the first virtual object being a virtual object in the same team as the (Continued)

800 controlled virtual object; and displaying a second expression in the virtual scene in response to an operation on the first expression, the second expression being used for replying to the first expression.

20 Claims, 12 Drawing Sheets

(58) Field of Classification Search
USPC ............................................................ 463/31
See application file for complete search history.

(56) References Cited

U.S. PATENT DOCUMENTS

| | | | | |
|---|---|---|---|---|
| 2009/0063995 | A1* | 3/2009 | Baron | H04N 7/17318 715/753 |
| 2009/0182826 | A1 | 7/2009 | Izumi | |
| 2010/0083148 | A1* | 4/2010 | Finn | A63F 13/12 715/764 |
| 2010/0287510 | A1* | 11/2010 | Cragun | G09B 21/00 715/848 |
| 2017/0038917 | A1* | 2/2017 | Reicher | G06F 3/03543 |
| 2018/0169522 | A1 | 6/2018 | Kurabayashi | |
| 2020/0153775 | A1 | 5/2020 | Chen et al. | |
| 2021/0314284 | A1 | 10/2021 | Zhai | |
| 2022/0053241 | A1* | 2/2022 | Dewa | H04N 21/816 |
| 2023/0390650 | A1 | 12/2023 | Ye et al. | |
| 2024/0082718 | A1 | 3/2024 | Song | |

FOREIGN PATENT DOCUMENTS

| | | | |
|---|---|---|---|
| CN | 110292778 | A | 10/2019 |
| CN | 110368691 | A | 10/2019 |
| CN | 110694261 | A | 1/2020 |
| CN | 110917623 | A | 3/2020 |
| CN | 113599815 | A | 11/2021 |
| JP | 2007183811 | A | 7/2007 |
| JP | 2017038819 | A | 2/2017 |
| JP | 2017072919 | A | 4/2017 |
| JP | 2018051269 | A | 4/2018 |
| JP | 2019083565 | A | 5/2019 |
| WO | 2018104834 | A1 | 6/2018 |
| WO | 2020100012 | A1 | 5/2020 |
| WO | 2020253754 | A1 | 12/2020 |

OTHER PUBLICATIONS

Apex Legends Wiki: Season 6; https://apexlegends.wiki.gg/wiki/Season_6 (Year: 2020).*

The Japan Patent Office (JPO) Notice of Reasons for Refusal for Application No. 2023-571348 Nov. 12, 2024 * Pages (including translation).

[BanG Dream!] I'll show you everything you need to know about using Garupa stamps. [Girls Band Party!] Game strategy and Review, Oct. 27, 2020, https://jpneet.com/game/bangdre-girlpa-stamp.

Stamp list backup (No. 37), Granblue Fantasy (Grub), Strategy Wiki, Jul. 21, 2021, https://gbf-wiki.com/index.php?cmd=backup&page=Stamp list&age=37.

The World Intellectual Property Organization (WIPO) International Search Report for PCT/CN2022/110870 Oct. 21, 2022 7 Pages (including translation).

The State Intellectual Property Office of the People's Republic of China (SIPO) Office Action 1 for 202110981209.0 Jun. 12, 2023 8 Pages (including translation).

The Wind blows and the scalp feels cold, "How to use the Honor of Kings emoticon pack in the game", Quick Game, http://shouyou.kuai8.com/gonglue/903654.thml, Apr. 8, 2021 (Apr. 8, 2021), p. 1-2 6 Pages (including translation).

"King of Glory", "How to set the starting emoticon of King of Glory", "How to set up Honor of Kings to automatically use personalized emoticons at the start of the game", "Glory of Kings opening emoticon position", Duote Software Station, https://www.duote.com/tech/wzry/184443.html, May 25, 2021 (May 25, 2021), p. 1-2 7 Pages (including translation).

52pk, "How to use likes in the King of Glory game", https://www.52pk.com/gl/6413.html, Jun. 1, 2020 (Jun. 1, 2020). 4 pages (including translation).

* cited by examiner

EXPRESSION DISPLAY METHOD AND APPARATUS IN VIRTUAL SCENE, DEVICE AND MEDIUM

RELATED APPLICATION(S)

The present application is a continuation application of PCT Patent Application No. PCT/CN2022/110870 filed on Aug. 8, 2022, which claims priority to Chinese Patent Application No. 202110981209.0, filed on Aug. 25, 2021 and titled "EXPRESSION DISPLAY METHOD AND APPARATUS IN VIRTUAL SCENE, DEVICE AND MEDIUM", all of which are incorporated herein by reference in entirety.

FIELD OF THE TECHNOLOGY

The present disclosure relates to the technical field of computers, in particular to an expression display method and apparatus in a virtual scene, a device and a medium.

BACKGROUND

With the development of multimedia technologies, there is an increasing variety of games that may be played. The MOBA game is a popular game in which different virtual objects may fight against each other in a virtual scene.

SUMMARY

Embodiments of the present disclosure provide an expression display method and apparatus in a virtual scene, a device and a medium, which may improve the efficiency of human-computer interaction. The technical solutions are as follows.

In one aspect, there is provided an expression display method in a virtual scene, the method including:

- displaying a virtual scene with a controlled virtual object displayed in the virtual scene;
- displaying a first expression corresponding to a first interaction event in the virtual scene in response to that the first interaction event happens in the virtual scene, the first interaction event being an interaction event associated with a first virtual object, the first virtual object being a virtual object in the same team as the controlled virtual object; and
- displaying a second expression in the virtual scene in response to an operation on the first expression, the second expression being used for replying to the first expression.

In certain embodiment(s), the method includes: displaying a virtual scene (301); displaying a first expression corresponding to a first interaction event in the virtual scene in response to that the first interaction event happens in the virtual scene (302); and displaying a second expression in the virtual scene in response to an operation on the first expression (303).

In one aspect, there is provided an expression display apparatus in a virtual scene, the apparatus including: a memory storing computer program instructions; and a processor coupled to the memory and configured to execute the computer program instructions and perform: displaying a virtual scene with a controlled virtual object displayed in the virtual scene; displaying a first expression corresponding to a first interaction event in the virtual scene in response to that the first interaction event happens in the virtual scene, the first interaction event being an interaction event associated with a first virtual object, the first virtual object being a virtual object in the same team as the controlled virtual object; and displaying a second expression in the virtual scene in response to an operation on the first expression, the second expression being used for replying to the first expression.

In one aspect, there is provided a computing device, the computing device including one or more processors, and one or more memories having stored thereon at least one computer program which is stored in the one or more memories, the computer program being loaded and performed by the one or more processors to implement the expression display method in the virtual scene.

In an aspect, there is provided a non-transitory computer-readable storage medium, storing computer program instructions executable by at least one processor to perform: displaying a virtual scene with a controlled virtual object displayed in the virtual scene; displaying a first expression corresponding to a first interaction event in the virtual scene in response to that the first interaction event happens in the virtual scene, the first interaction event being an interaction event associated with a first virtual object, the first virtual object being a virtual object in the same team as the controlled virtual object; and displaying a second expression in the virtual scene in response to an operation on the first expression, the second expression being used for replying to the first expression.

Other aspects of the present disclosure may be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
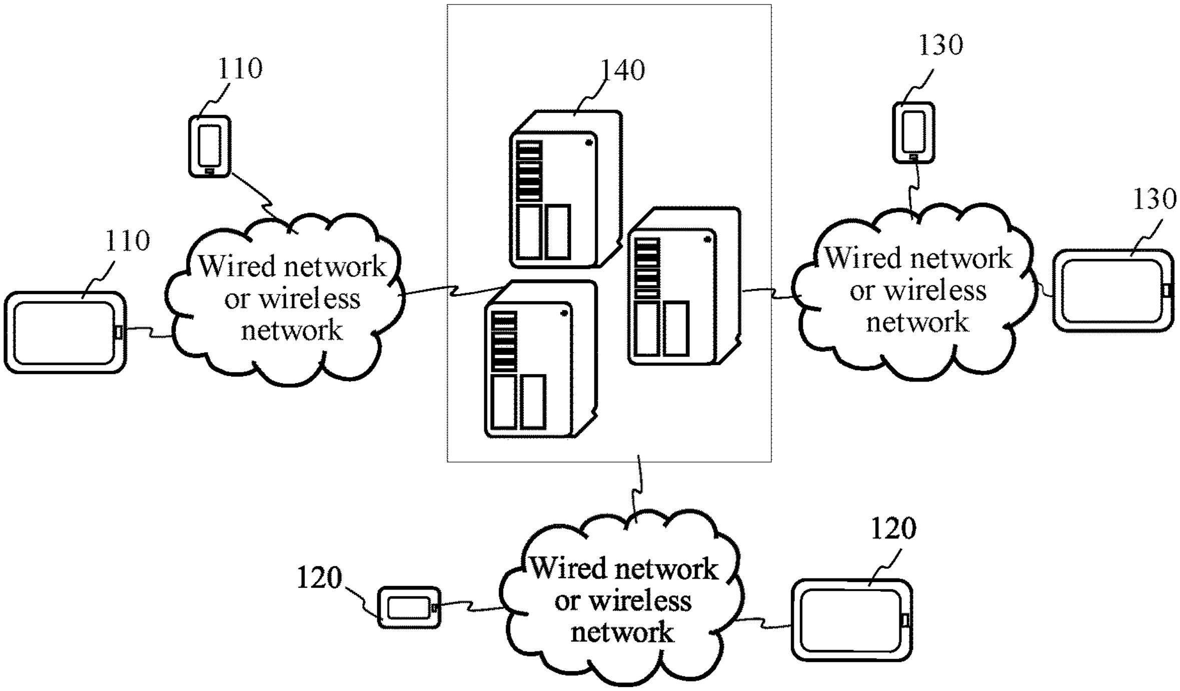
FIG. 1 is a schematic diagram of an implementation environment of an expression display method in a virtual scene according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of embodiments. When and as applicable, the term "an embodiment," "one embodiment," "some embodiment(s), "some embodiments," "certain embodiment(s)," or "certain embodiments" may refer to the same subset or different subsets of embodiments, and may be combined with each other without conflict.

In certain embodiments, the term "based on" is employed herein interchangeably with the term "according to."

If users want to send expressions while playing a multiplayer online battle arena (MOBA) game, they may need to call a chat window in the MOBA game, call an expression selection panel in the chat window, select an expression from the expression selection panel, and then click in a send control of the chat window, thereby achieving the purpose of sending the expression.

In certain embodiment(s), the operation of sending the expression by the user is cumbersome, resulting in less efficient human-computer interaction.

Firstly, the terms related to the embodiments of the present disclosure are described.

Virtual scene: it is a virtual scene displayed (or provided) in response to an application being running on a terminal. The virtual scene may be a simulated world for the real world, a semi-simulated and semi-fictional three-dimensional world, or a purely fictional three-dimensional world. The virtual scene may be any one of a two-dimensional virtual scene, a 2.5-dimensional virtual scene, and a three-dimensional virtual scene. In certain embodiment(s), the virtual scene may also be used for a battle between at least two virtual objects in a virtual world, in which virtual world there are virtual resources available for the at least two virtual objects. In certain embodiment(s), the virtual world includes symmetric lower left and upper right corner regions, which are respectively occupied by virtual objects belonging to two hostile camps, with a victory goal to destroy target buildings/strongholds/bases/crystals deep in the opposing regions.

Virtual object: it refers to a movable object in the virtual world. The movable object may be at least one of a virtual character, a virtual animal, and an animated character. In certain embodiment(s), in response to that the virtual world is a three-dimensional virtual world, the virtual objects may be three-dimensional stereoscopic models, and each virtual object has its own shape and volume in the three-dimensional virtual world, occupying a part of the space in the three-dimensional virtual world. In certain embodiment(s), the virtual object is a three-dimensional role constructed based on a three-dimensional human skeleton technology, and realizes different external images by wearing different skin. In some implementations, the virtual objects may also be realized using a 2.5-dimensional or 2-dimensional model, which will not be limited in the embodiments of the present disclosure. The user may perform an activity by operating a virtual object located in a virtual scene via a terminal, the activity including but not limited to: adjusting at least one of body posture, crawling, walking, running, riding, jumping, driving, picking-up, shooting, attacking and throwing. Exemplarily, the virtual object is a virtual character, such as a simulated character role or an animated character role.

Multiplayer Online Battle Arena means: it means that in the virtual world, different virtual teams, which belong to at least two hostile camps, occupy their respective areas, and compete with each other by taking a certain winning condition as a goal. Such winning condition includes, but is not limited to: at least one of occupying a stronghold or destroying a stronghold of the hostile camp, killing a virtual object of the hostile camp, guaranteeing the self survival in a specified scene and time, seizing a certain resource, and surpassing the opponent within the specified time. Battle arena may be performed in rounds, and maps of each round of battle arena may be the same or different. Each virtual team includes one or more virtual objects, such as 1, 2, 3 or 5.

MOBA Game: it is a game that provides several strongholds in a virtual world for users in different teams to control virtual objects to fight, occupy strongholds or destroy strongholds in the hostile team in the virtual world. For example, the MOBA game may divide the users into two hostile teams, and spread the virtual objects controlled by the users across the virtual world to compete with each other to destroy or occupy all of strongholds as a winning condition. The MOBA game is performed in rounds, and the duration of one round of the MOBA game ranges from a moment when the game starts to a moment when the winning condition is reached.

FIG. 1 is a schematic diagram of an implementation environment of an expression display method in a virtual scene as provided by an embodiment of the present disclosure. Referring to FIG. 1, the implementation environment includes a first terminal 110, a second terminal 120, a third terminal 130, and a server 140.

The first terminal 110, the second terminal 120, the third terminal 130, and the server 140 may be directly or indirectly connected through wired or wireless communication, which will not be limited in the present disclosure.

In certain embodiment(s), the first terminal 110 is a smart phone, a tablet computer, a notebook computer, a desktop computer, a smart watch, or the like, but is not limited thereto. The first terminal 110 is installed with and runs an application program for displaying the virtual scene. The application program may be used to initiate any one of a first-person shooting game (FPS), a third-person shooting game, a multiplayer online battle arena game (MOBA), a virtual reality application program, a three-dimensional map program, or a multiplayer survival game. Exemplarily, the first terminal 110 is a terminal used by a first user.

In certain embodiment(s), the second terminal 120 is a smart phone, a tablet computer, a notebook computer, a desktop computer, a smart watch, etc., but is not limited thereto. The second terminal 120 is installed with and runs an application program of the same type as the first terminal 110. Exemplarily, the second terminal 120 is a terminal used by a second user, the second user being a user in the same team as the first user. Accordingly, a virtual object controlled by the second terminal 120 is a virtual object in the same team as the virtual object controlled by the first terminal 110.

In certain embodiment(s), the third terminal 130 is, but not limited to, a smart phone, a tablet computer, a notebook computer, a desktop computer, a smart watch, etc., but is not limited thereto. The third terminal 130 is installed with and runs an application program of the same type as the first terminal 110. Exemplarily, the third terminal 130 is a terminal used by a third user, the third user being a user in a different team from the first user. Accordingly, a virtual object controlled by the third terminal 130 is a virtual object in a different team from the virtual object controlled by the first terminal 110.

In the embodiments of the present disclosure, the virtual object controlled by the first terminal 110 is referred to as a controlled virtual object, and the virtual objects controlled by the second terminal 120 and the third terminal 130 are collectively referred to as other virtual objects. That is to say, in the following description process, taking the first terminal 110 being an executive main body as an example, if the technical solution provided in the embodiments of the present disclosure is performed by the second terminal 120 or the third terminal 130, the controlled virtual object controlled by the second terminal 120 or the third terminal 130 is also the controlled virtual object. The controlled virtual object and the other virtual objects are in the same virtual scene. The first user may control the controlled virtual object to interact with the other virtual objects in the virtual scene via the first terminal 110, that is, together with the virtual object controlled by the second terminal 120, fight against the virtual object controlled by the third terminal 130.

It should be noted that the number of the second terminal 120 and the third terminal 130 is one or more, which will not be limited in the embodiments of the present disclosure.

In certain embodiment(s), the server 140 may be an independent physical server, a server cluster or a distributed system composed of a plurality of physical servers, or a could server that provides cloud services, cloud databases, cloud computing, cloud functions, cloud storage, network services, cloud communications, middleware services, domain name services, security services, content delivery network (CDN), as well as big data, artificial intelligence platforms and other cloud computing services. The server 140 is used for providing a background service of an application program with a virtual scene being displayed, such as for processing data uploaded by the first terminal 110, the second terminal 120 and the third terminal 130, and feeding back a data processing result to the first terminal 110, the second terminal 120 and the third terminal 130, so as to realize the fighting between the virtual objects.

After introducing the implementation environment in the embodiments of the present disclosure, an implementation scene in the embodiments of the present disclosure will be described below. In the following description, the terminal is also any one of the first terminal 110, the second terminal 120 and the third terminal 130 in the above-mentioned implementation environment, and the server is also the server 140 in the above-mentioned implementation environment.

The expression display method in the virtual scene provided by the embodiments of the present disclosure may be applied to MOBA games, FPS games or auto chess games, which will not be limited in the embodiments of the present disclosure.

In response to that the expression display method in the virtual scene provided by the embodiments of the present disclosure is applied to MOBA games, taking one round of MOBA game including 10 users as an example, the 10 users are divided into two teams for fighting, and the two teams are respectively referred to as team A and team B. A game character controlled by a user via a terminal is also the controlled virtual object, and the controlled virtual object belonging to team A is described as an example. In response to that a first interaction event happens in the virtual scene, the terminal displays a first expression in the virtual scene. The first interaction event includes that other users in team A send the first expression in the virtual scene; or other users in team A control the virtual objects to perform a target event in the virtual scene, for example, other users in team A control the virtual objects to consecutively defeat a plurality of users in team B in the virtual scene; or other users in team A control virtual objects to defeat a wild monster in the virtual scene, etc., which will not be limited in the embodiments of the present disclosure. The wild monster refers to a virtual object controlled by artificial intelligence. After the terminal displays the first expression in the virtual scene, if the user wants to reply to the first expression, a second expression for replying to the first expression may be sent quickly by directly performing a corresponding operation on the first expression, without opening a chat window for expression selection, thereby achieving high efficiency of human-computer interaction.

In response to that the expression display method in the virtual scene provided by the embodiments of the present disclosure is applied to FPS games, taking one round of FPS game including 10 users as an example, the 10 users are divided into two teams for fighting, and the two teams are respectively referred to as team A and team B. A game character controlled by a user via a terminal is also the controlled virtual object, and the controlled virtual object belonging to team A is described as an example. When a first interaction event happens in the virtual scene, the terminal displays a first expression in the virtual scene. The first interaction event includes that other users in team A send the first expression in the virtual scene; or other users in team A control the virtual objects to perform a target event in the virtual scene, for example, other users in team A control the virtual objects to consecutively defeat a plurality of users in team B in the virtual scene; or other users in team A control virtual objects to successfully defuse virtual bombs in the virtual scene, etc., which will not be limited in the embodiments of the present disclosure. After the terminal displays the first expression in the virtual scene, if the user wants to reply to the first expression, a second expression for replying to the first expression may be sent quickly by directly performing a corresponding operation on the first expression, without opening a chat window for expression selection, thereby achieving high efficiency of human-computer interaction.

In response to that the expression display method in the virtual scene provided by the embodiments of the present disclosure is applied to auto chess games, taking one round of the auto chess game including 10 users as an example, the 10 users are divided into five teams for fighting, that is, every two users belong to one team. The five teams are counted as Team A, Team B, Team C, Team D and Team E. A game character controlled by a user via a terminal is also the controlled virtual object, and the controlled virtual object belonging to team A is described as an example. In response to that a first interaction event happens in the virtual scene, the terminal displays a first expression in the virtual scene. The first interaction event includes that another user in team A sends the first expression in the virtual scene; or another user in team A controls the virtual object to perform a target event in the virtual scene, for example, another user in team A controls the virtual object to consecutively defeat users in other four teams in the virtual scene, etc., which will not be limited in the embodiments of the present disclosure. After the terminal displays the first expression in the virtual scene, if the user wants to reply to the first expression, a second expression for replying to the first expression may be sent quickly by directly performing a corresponding operation on the first expression, without opening a chat window for expression selection, thereby achieving high efficiency of human-computer interaction.

It should be noted that in the above description process, the expression display method in the virtual scene as provided by the embodiments of the present disclosure is described by taking the implementation to the MOBA games, the FPS games or the auto chess games as an example. In other implementations, the expression display method in the virtual scene as provided by the embodiment of the present disclosure may also be applied to other types of games, which will not be limited in the embodiments of the present disclosure.

In the following description process, the expression display method in the virtual scene as provided by the embodiment of the present disclosure is described by taking the implementation to the MOBA games as an example.

In order to describe the technical solution provided by the present disclosure more clearly, taking the MOBA game as an example, an interface of the MOBA game is described.

Figure 2:
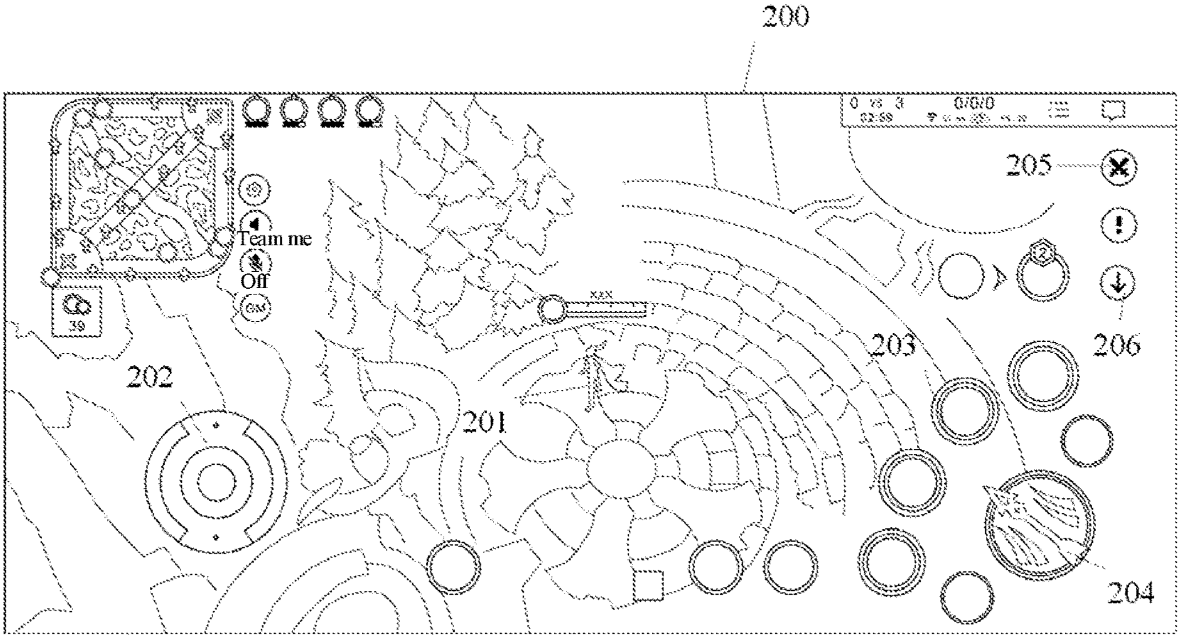
FIG. 2 is a schematic diagram of an interface according to certain embodiment(s) of the present disclosure.

Referring to FIG. 2, a virtual scene 200 is included, in which a controlled virtual object 201 is displayed. A user may control behaviors of the virtual object 201 in the virtual scene by means of the following buttons:

A joystick 202: a user may control the controlled virtual object to move in the virtual scene by touching the joystick 202. In some embodiments, the user may also control a movement direction of a dependent virtual object of the controlled virtual object by touching the joystick 202, wherein the dependent virtual object may be a virtual object that may be summoned by the controlled virtual object through virtual skills.

Skill controls 203: the user may release different skills by clicking on different skill controls 203. In some embodiments, the user may also control a skill release direction by dragging the skill control 203.

An attack control 204: a user may control the virtual object to make a “normal attack” by clicking on the attack control 204. The user may set different “normal attack” for different virtual objects. For example, the user may set “normal attack” modes for the first type of virtual objects as “prioritize the attack on the nearest unit”. The user may set the “normal attack” mode for the second type of virtual objects as “prioritize the attack on a unit with a minimum virtual life value”. The terminal may control the controlled virtual object to execute a different “normal attack” mode when the user clicks on the attack control 204 according to the “normal attack” mode set by the user.

A signal sending control 205: the user may send a shortcut signal to other users on the same team by clicking on the signal sending control 205. For example, a signal for reminding the disappearance of an enemy, or a signal for reminding the initiation of an attack, or a signal for reminding the withdrawal, etc. are sent, which will not be limited in the embodiments of the present disclosure. In some embodiments, the shortcut signal is displayed in the form of an expression in the virtual scene. For example, the signal for reminding the initiation of the attack is displayed as an expression where two swords intersect in the virtual scene, and the signal for reminding the withdrawal is displayed as a shield expression in the virtual scene.

A feature extension control 206: the user may control the terminal to display other controls by clicking on the feature extension control 206. For example, after the user clicks on the feature extension control 206, the terminal may display other types of signal sending controls in the virtual scene 200, or display an expression sending control, etc.; and the user may send an expression in the virtual scene by clicking on the expression sending control, and this expression may be seen by other users in the same team.

In the embodiments of the present disclosure, the technical solutions provided in the present disclosure may be performed by the first terminal 110, the second terminal 120 or the third terminal 130, which will not be limited in the embodiments of the present disclosure. The following will be explained by taking the executive main body being the first terminal 110 as an example.

Figure 3:
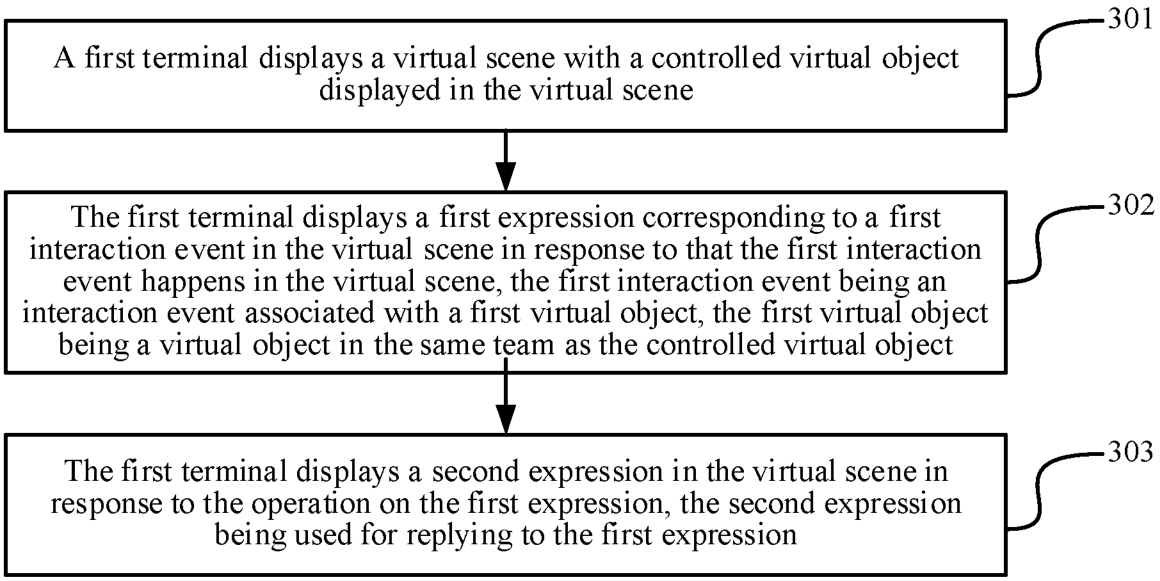
FIG. 3 is a flowchart of an expression display method in a virtual scene according to certain embodiment(s) of the present disclosure.

FIG. 3 is a flowchart of an expression display method in a virtual scene as provided by an embodiment of the present disclosure. Referring to FIG. 3, the method includes the following steps:

Step 301: The first terminal displays a virtual scene with a controlled virtual object displayed in the virtual scene.

The virtual scene is a game scene. The controlled virtual object is also a virtual object controlled by the first terminal in the virtual scene. The user may control the controlled virtual object to move in the virtual scene and fight against other virtual objects through the first terminal.

Step 302: The first terminal displays a first expression corresponding to a first interaction event in the virtual scene in response to that the first interaction event happens in the virtual scene, the first interaction event being an interaction event associated with a first virtual object, the first virtual object being a virtual object in the same team as the controlled virtual object.

The interaction event is an event having an interactive nature in the virtual scene, e.g., an event that a user controls the virtual object to defeat virtual objects of other teams in the virtual scene, or a user controls the virtual object to defeat a certain wild monster in the virtual scene. In some embodiments, the wild monster is also referred to as a neutral creature. The user controlling the virtual object to defeat the certain wild monster may add attribute values to the virtual object controlled by himself/herself and a virtual object controlled by another user in the same team, e.g., increase the attack power, defense power or skill damage of the virtual object. The first expression corresponds to the first interaction event. The first terminal displaying the first expression may also function to remind the occurrence of the first interaction event in the virtual scene.

Step 303: The first terminal displays a second expression in the virtual scene in response to an operation on the first expression, the second expression being used for replying to the first expression.

Through the technical solutions provided by the embodiments of the present disclosure, during the game, the first expression corresponding to the first interaction time is displayed in the virtual scene in response to a teammate of the controlled virtual object triggering the first interaction event. In response to that a player wants to reply to the first expression, there may not be a need to open the chat box to select, and a response on the second expression may be made rapidly by performing the operation on the first expression directly, thereby achieving high efficiency of human-computer interaction.

The above-mentioned steps 301 and 303 are a brief introduction to the technical solutions provided by the present disclosure. The technical solutions provided by the present disclosure will be described in detail below with reference to some examples.

Figure 4:
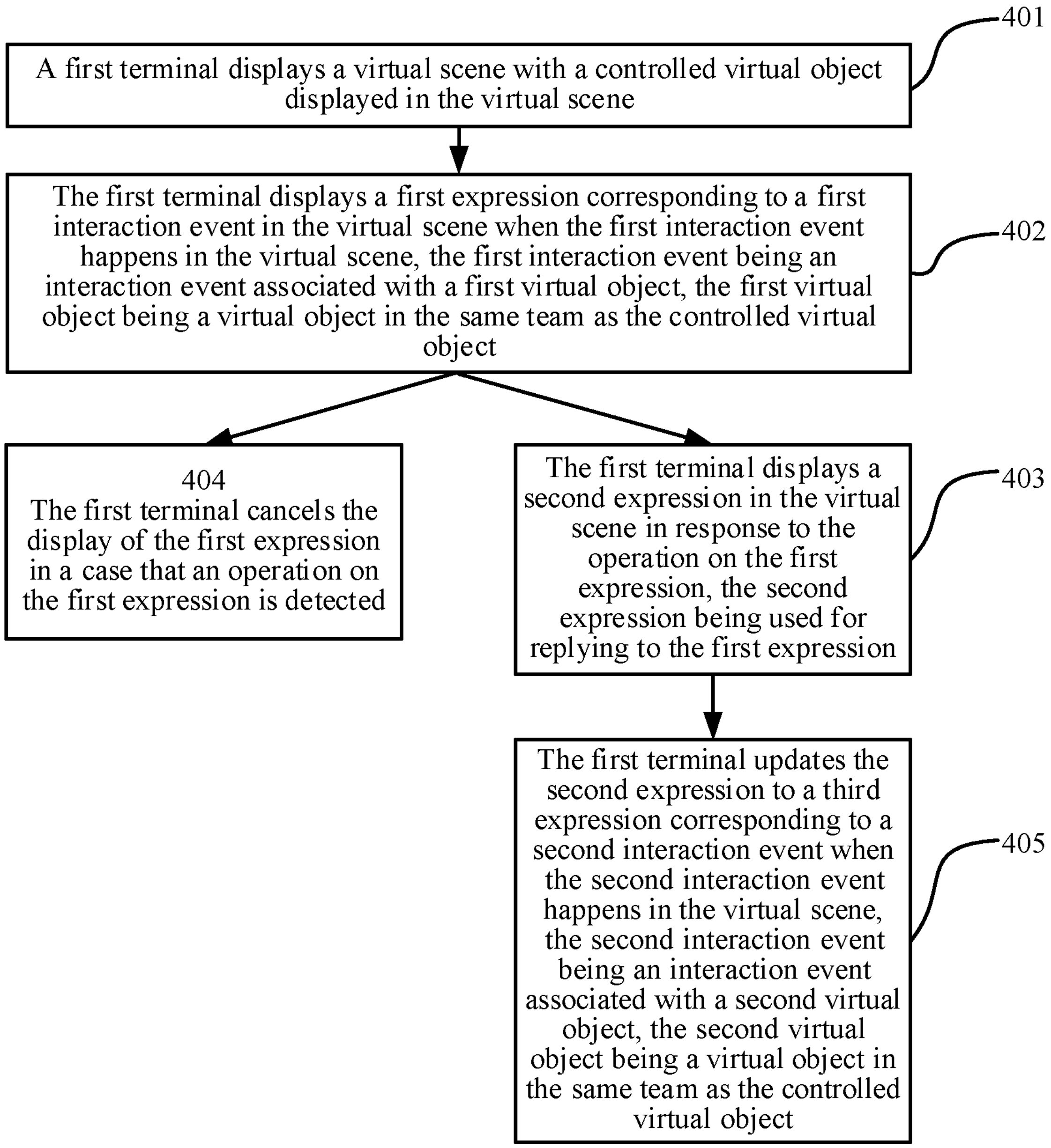
FIG. 4 is a flowchart of an expression display method in a virtual scene according to certain embodiment(s) of the present disclosure.

FIG. 4 is a flowchart of an expression display method in a virtual scene as provided by an embodiment of the present disclosure. Referring to FIG. 4, the method includes the following steps:

Step 401: The first terminal displays a virtual scene with a controlled virtual object displayed in the virtual scene.

In some embodiments, the virtual scene is a game scene of the MOBA game, and the controlled virtual object is a virtual object controlled by the first terminal. The user may control the virtual object through the first terminal to perform behaviors, e.g., to move in the virtual scene, release virtual skills to attack virtual objects in other teams or release virtual skills to treat virtual objects in the same team.

In some embodiments, in response to that the user opens a virtual counterpart, the first terminal displays a virtual scene corresponding to the virtual counterpart, and displays a controlled virtual object in the virtual scene. One virtual counterpart is also one round of the MOBA game, the virtual scene displayed by the first terminal is a partial area of the virtual scene, the controlled virtual object is displayed in the center of the virtual scene displayed by the first terminal, and the virtual scene displayed by the first terminal moves with the movement of the controlled virtual object. In some embodiments, the virtual scene displayed by the first terminal is also referred to as a field of view range of the controlled virtual object. In response to that other virtual objects enter the field of view range of the controlled virtual object, the first terminal may also display the other virtual objects.

Referring to FIG. 2, the first terminal displays the virtual scene 200 in which the controlled virtual object 201 is displayed.

Step 402: The first terminal displays a first expression corresponding to a first interaction event in the virtual scene in response to that the first interaction event happens in the virtual scene, the first interaction event being an interaction event associated with a first virtual object, the first virtual object being a virtual object in the same team as the controlled virtual object.

In some embodiments, the first terminal displays the first expression in the virtual scene in response to that a control terminal of the first virtual object issues the first expression in the virtual scene. The first expression issued by the control terminal of the first virtual object in the virtual scene is also one first interaction event, and an expression corresponding to the first interaction event is also the first expression. Corresponding to the implementation environment in the embodiments of the present disclosure, the control terminal of the first virtual object is also the second terminal 120 in the implementation environment, and a user using the second terminal 120 and a user using the first terminal 110 are teammates in this round of the game.

In response to that the control terminal of the first virtual object, i.e., the second terminal, issues the first expression in the virtual scene, the first terminal may display the first expression so as to realize the communication between different users in the same team and improve the efficiency of human-computer interaction.

For example, the second terminal displays the virtual scene, and the virtual scene displayed by the second terminal includes a virtual object controlled by the second terminal, i.e., the first virtual object. In the game process, in response to that the user using the second terminal, i.e., a second user, wants to communicate with other users in the same team by sending expressions, the second user may trigger an expression transmission operation in the virtual scene displayed on the second terminal. In response to the expression transmission operation, the second terminal sends a first request to a server, the first request carrying a first expression corresponding to the expression transmission operation. The server acquires the first expression from the first request in response to receiving the first request, and sends a first instruction to the first terminal, the first instruction carrying the first expression. The first terminal acquires the first expression from the first instruction in response to receiving the first instruction. The first terminal displays the first expression in the virtual scene.

The operation of displaying, by the second user, the expression transmission operation triggered in the virtual scene on the second terminal includes any one of the followings.

1. The second user clicks on a control corresponding to the first expression in the virtual scene displayed on the second terminal.

The control corresponding to the first expression is a signal sending control or an expression sending control. The following will be described by taking the control corresponding to the first expression being the signal sending control and the expression sending control respectively as an example.

Taking the control corresponding to the first expression as the signal sending control as an example, the signal sending control is also the signal sending control 205 in FIG. 2. In response to that the virtual scene displayed on the second terminal includes the signal sending control, the second terminal sends a first request to a server in response to a clicking operation on the expression sending control, the first request carrying the first expression corresponding to the expression sending control. The server acquires the first expression from the first request in response to receiving the first request, and sends a first instruction to the first terminal, the first instruction carrying the first expression. The first terminal acquires the first expression from the first instruction in response to receiving the first instruction. The first terminal displays the first expression in the virtual scene.

In some embodiments, the signal sending controls include sending controls that send an attack signal, a retreat signal, and a disappearance signal. The attack signal is used for reminding the teammate to control the virtual object to initiate an attack, the retreat signal is used for reminding the teammate to control the virtual object to withdraw, and the disappearance signal is used for reminding the teammate that a hostile virtual object disappears and attention may need to be paid. Accordingly, in response to that the signal sending control clicked by the second user is a sending control for sending the attack signal, the first expression corresponding to the signal sending control is an expression for reminding to the initiation of an attack, for example, an expression where two swords intersect. In response to that the signal sending control clicked by the second user is a sending control for sending the retreat signal, the first expression corresponding to the signal sending control is an expression for reminding the withdrawal, such as a shield expression. In response to that the signal sending control clicked by the second user is a sending control for sending the disappearance signal, the first expression corresponding to the signal sending control is an expression for reminding the disappearance of an enemy, such as an exclamation mark expression.

Figure 5:
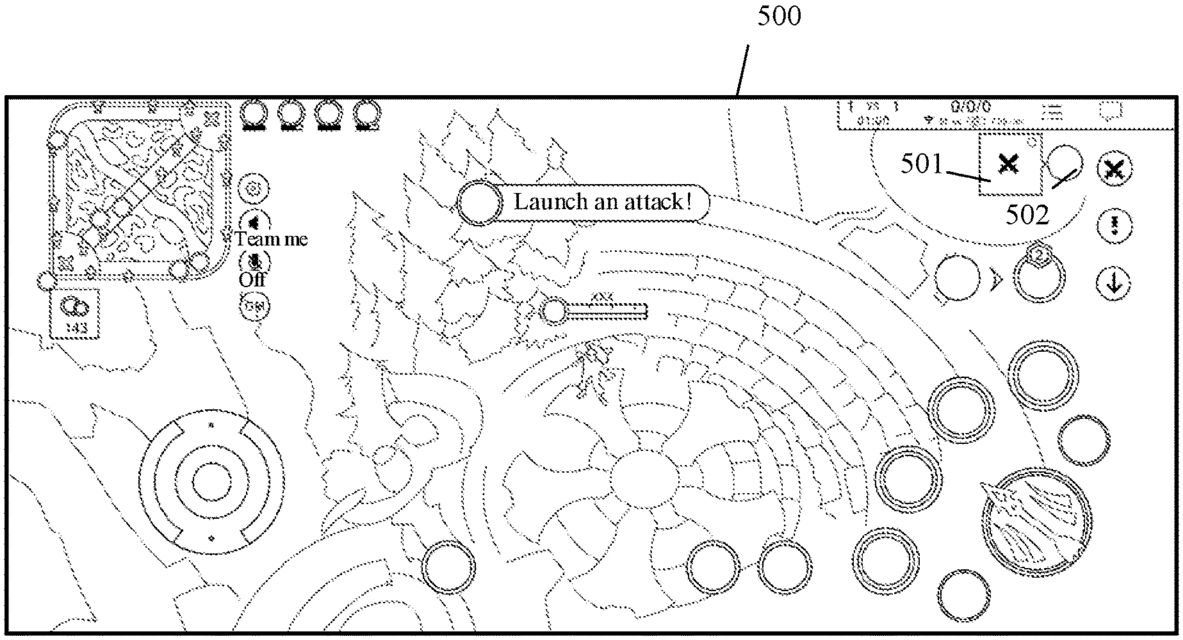
FIG. 5 is a schematic diagram of an interface according to certain embodiment(s) of the present disclosure.

In response to that the signal sending control clicked by the second user is an attack signal sending control, referring to FIG. 5, the first terminal may display a first expression 501 in the virtual scene 500, the first expression 501 being also an expression for reminding the initiation of an attack.

Taking the control corresponding to the first expression being the expression sending control as an example, the expression sending control is a control displayed after clicking on the feature extension control 206 in FIG. 2. In response to the clicking operation on the expression sending control, the second terminal sends a first request to the server, the first request carrying the first expression corresponding to the expression sending control. The server acquires the first expression from the first request in response to receiving the first request, and sends a first instruction to the first terminal, the first instruction carrying the first expression. The first terminal acquires the first expression from the first instruction in response to receiving the first instruction. The first terminal displays the first expression in the virtual scene.

2. The second user calls a chat window in the virtual scene displayed on the second terminal, an expression selection control being displayed in the chat window. The second terminal displays at least one candidate expression in response to the clicking operation of the second user on the expression selection control. The second user clicks on a first expression in the at least one candidate expression.

The virtual scene displayed on the second terminal includes a chat control. In response to a clicking operation on the chat control, the second terminal displays a chat window in the virtual scene, and the expression selection control is displayed in the chat window. The second terminal displays at least one candidate expression in response to the clicking operation of the second user on the expression selection control. In response to a clicking operation on the first expression in the at least one candidate expression, the second terminal sends the first request to a server, the first request carrying the first expression. The server acquires the first expression from the first request in response to receiving the first request, and sends a first instruction to the first terminal, the first instruction carrying the first expression. The first terminal acquires the first expression from the first instruction in response to receiving the first instruction. The first terminal displays the first expression in the virtual scene.

In some embodiments, in response to the expression transmission operation, the second terminal is further capable of displaying the first expression corresponding to the expression transmission operation in the virtual scene. The first expression sent by the second terminal may be displayed not only on the first terminal but also on the second terminal for the second user to view.

In some embodiments, in response to of a plurality of second terminals, the server may send, in addition to the first instruction to the first terminal, the first instruction to other second terminals to cause the other second terminals to display the first expression in the virtual scene.

In this embodiment, all the users in the same team may view the first expression sent by the second terminal, so as to realize the interaction between a plurality of users in the same team and improve the interaction efficiency.

In some embodiments, in response to that a first virtual object triggers a target event in the virtual scene, the first terminal displays the first expression corresponding to the target event in the virtual scene. In some embodiments, the first virtual object triggering the target event in the virtual scene is also referred to as a "highlight moment" of the first virtual object.

In some embodiments, the target event includes any of the followings: the first virtual object defeats a target virtual creature in the virtual scene; the first virtual object robs the target virtual creature from the second virtual object in the virtual scene; the first virtual object defeats one second virtual object in the virtual scene, and the second virtual object is the first virtual object defeated in the virtual scene; and the first virtual object defeats a plurality of second virtual objects consecutively in the virtual scene.

The target virtual creature refers to a virtual creature with a higher attribute value in a virtual scene, and defeating the target virtual creature may add attribute values to all the virtual objects in the same team. For example, life values, or attack power or defense power, etc. may be added to all virtual objects in the same team. In some embodiments, defeating the target creature may also summon a virtual creature in the virtual scene, and the summoned virtual creature may help defeat a team fight of the target virtual creature. Defeating the target virtual creature in the virtual scene may enhance the fighting capability of the own team and increase the winning probability of the own team. The first virtual object is a virtual object in the same team as the controlled virtual object, namely, a virtual object controlled by the second terminal; and the second virtual object is a virtual object in a different team from the controlled virtual object, namely, a virtual object controlled by the third terminal.

"The first virtual object robs the target virtual creature from the second virtual object in the virtual scene" means that a damage value caused by the second virtual object to the target virtual creature is greater than a target threshold value, but the target virtual creature is defeated by the first virtual object, wherein the "defeated" means "the final blow", that is to say, the attack of the first virtual object reduces a virtual life value of the target virtual creature to zero.

"The first virtual object defeats one second virtual object in the virtual scene, and the second virtual object is the first virtual object defeated in the virtual scene" means that the first virtual object defeats a virtual object in a hostile team first in a virtual counterpart. In some embodiments, this scenario is referred to as the "First Blood" in the MOBA game.

"The first virtual object defeats a plurality of second virtual objects consecutively in the virtual scene" means that the first virtual object defeats the plurality of second virtual objects consecutively at a frequency less than or equal to a target time interval in the virtual scene. The target time interval is set by a person skilled in the art according to actual situations, for example, being set as 10 s or 15 s, which will not be limited in the embodiments of the present disclosure. In response to that the target time interval is 10 s, it means that the first virtual object defeats the plurality of second virtual objects, and the time interval between moments of defeating any two second virtual objects is less than or equal to 10 s. In the MOBA game, a scenario where the first virtual object defeats two second virtual objects consecutively in the virtual scene at a frequency less than or equal to the target time interval is referred to as "double-kill" or "double-break"; and a scenario where three second virtual objects are defeated consecutively is referred to as "triple kill" or "triple break", and so on.

Figure 6:
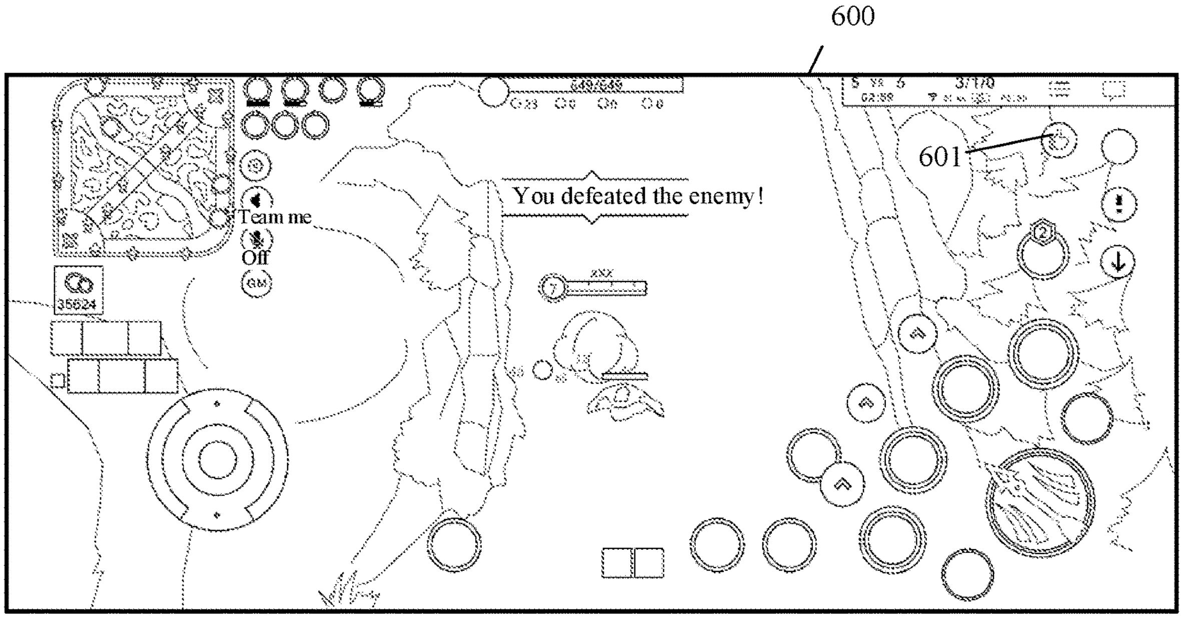
FIG. 6 is a schematic diagram of an interface according to certain embodiment(s) of the present disclosure.

For example, the server sends the first instruction to a first terminal in response to the first virtual object triggering the target event in the virtual scene, in the first instruction carrying the first expression corresponding to the target event. The first terminal receives the first instruction, then acquires the first expression from the first instruction, and displays the first expression in the virtual scene. For example, taking the target event where the first virtual object defeats the plurality of second virtual objects consecutively in the virtual scene as an example, referring to FIG. 6, in response to the first virtual object triggering the target event in the virtual scene, the first terminal displays the first expression 601 in the virtual scene 600, the first expression 601 being a "Thumb" expression.

In some embodiments, in response to that the first virtual object is defeated in the virtual scene and the control terminal of the first virtual object issues the first expression in the virtual scene, the first terminal displays the first expression in the virtual scene.

The first virtual object being defeated in the virtual scene means that the life value of the first virtual object is reduced to zero. In some embodiments, the first virtual object may be defeated by the second virtual object in the virtual scene, may be defeated by a defense tower, or may be defeated by a virtual creature, which will not be limited in the embodiments of the present disclosure. In this implementation, the first expression is an expression of apology or frustration from a user controlling the first virtual object, i.e., the second user.

For example, a second terminal displays an expression sending control corresponding to the first expression in the virtual scene in response to that the first virtual object is defeated in the virtual scene. In response to a clicking operation on the expression sending control, the second terminal sends the first request to the server, the first request carrying the first expression. The server acquires the first expression from the first request in response to receiving the first request, and sends a first instruction to the first terminal, the first instruction carrying the first expression. In response to the first instruction, the first terminal acquires the first expression from the first instruction. The first terminal displays the first expression in the virtual scene.

Figure 7:
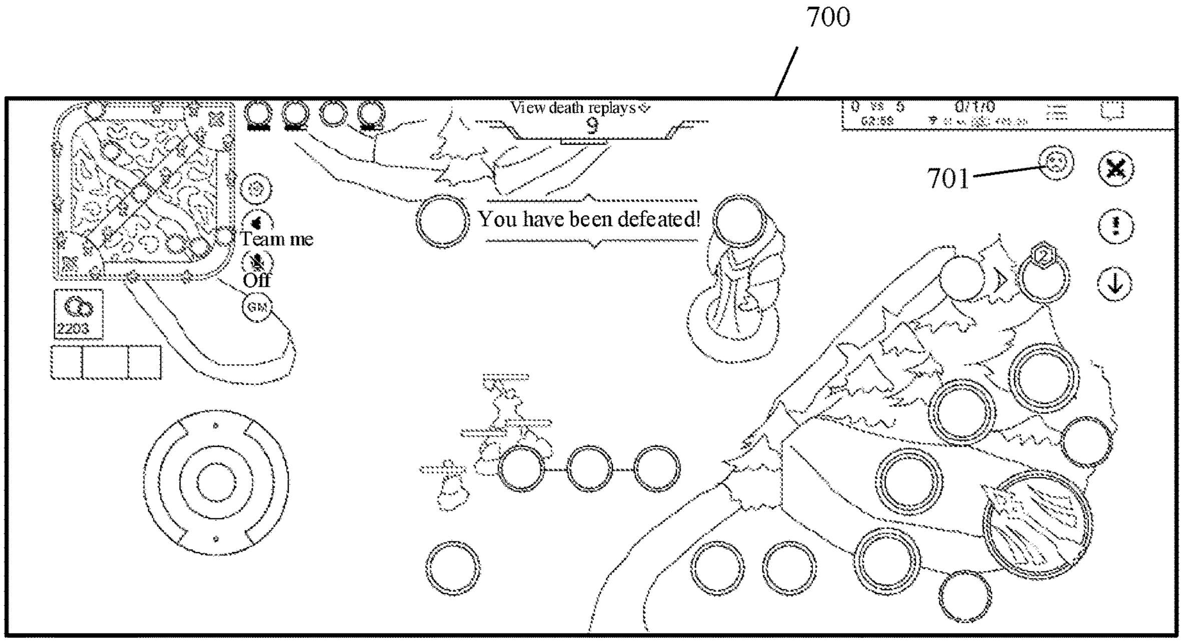
FIG. 7 is a schematic diagram of an interface according to certain embodiment(s) of the present disclosure.
Figure 8:
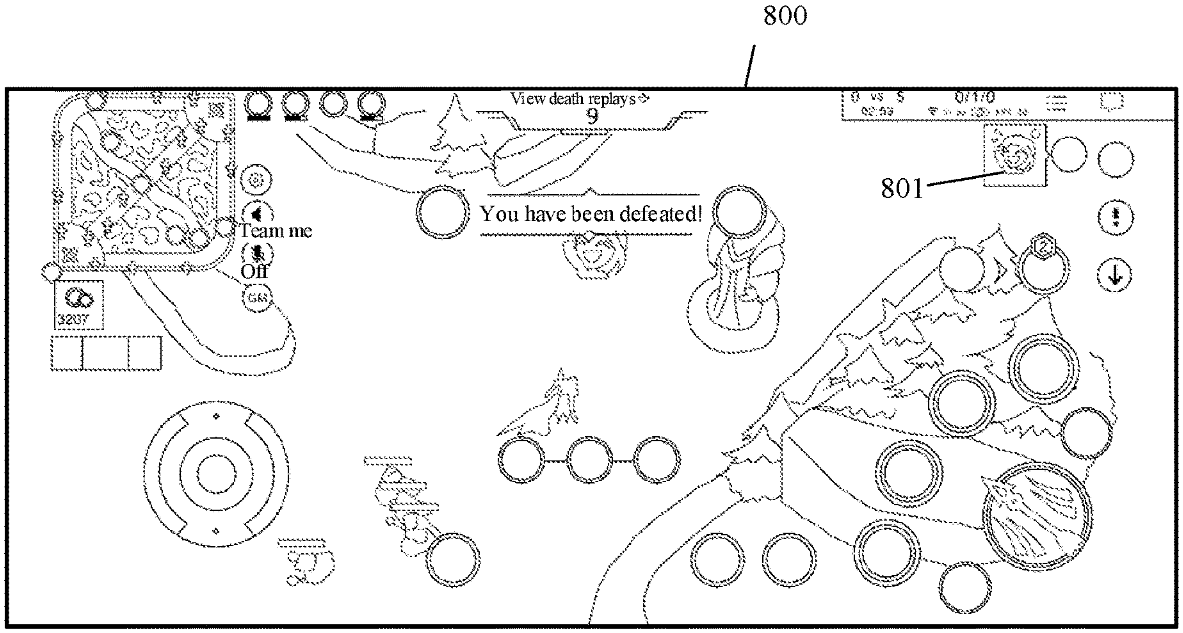
FIG. 8 is a schematic diagram of an interface according to certain embodiment(s) of the present disclosure.

For example, referring to FIG. 7, a second terminal displays an expression sending control 701 corresponding to the first expression in a virtual scene 700 in response to that the first virtual object is defeated in the virtual scene. In response to a clicking operation on the expression sending control, referring to FIG. 8, the first terminal displays a first expression 801 corresponding to the expression sending control 701 in the virtual scene 800, wherein the first expression 801 is a "Sad" expression.

In some embodiments, in response to that the first interaction event happens in the virtual scene, the first terminal plays an animation corresponding to the first expression in the virtual scene.

The animation corresponding to the first expression is configured by a person skilled in the art. For example, the person skilled in the art makes an expression and an animation corresponding to the expression well, and then stores the expression and the animation corresponding to the expression in a binding mode. In the scenario that the first interaction event happens in the virtual scene, the first terminal may directly load the animation corresponding to the first expression, and play the animation in the virtual scene.

In some embodiments, the first terminal displays an avatar of the first virtual object next to the first expression. For example, referring to FIG. 5, the first terminal displays an avatar 502 of a first virtual object next to the first expression 501.

In this implementation, a user may quickly know that the first expression is an expression sent by a control terminal (i.e., the second terminal) of the first virtual object by looking at the avatar next to the first expression, so as to facilitate the user to decide whether to reply to the first expression, thereby achieving high efficiency of human-computer interaction.

A position where the first terminal displays the first expression is described below.

In some embodiments, avatars of a plurality of virtual objects in the team are displayed in the virtual scene; and in response to the first interaction event happening in the virtual scene, the first terminal displays the first expression corresponding to the first interaction event under the avatar of the first virtual object.

In this implementation, a user may quickly know that the first expression is an expression sent by the control terminal (i.e., the second terminal) of the first virtual object by looking at an avatar above the first expression, so as to facilitate the user to decide whether to reply to the first expression, thereby achieving high efficiency of human-computer interaction.

Figure 9:
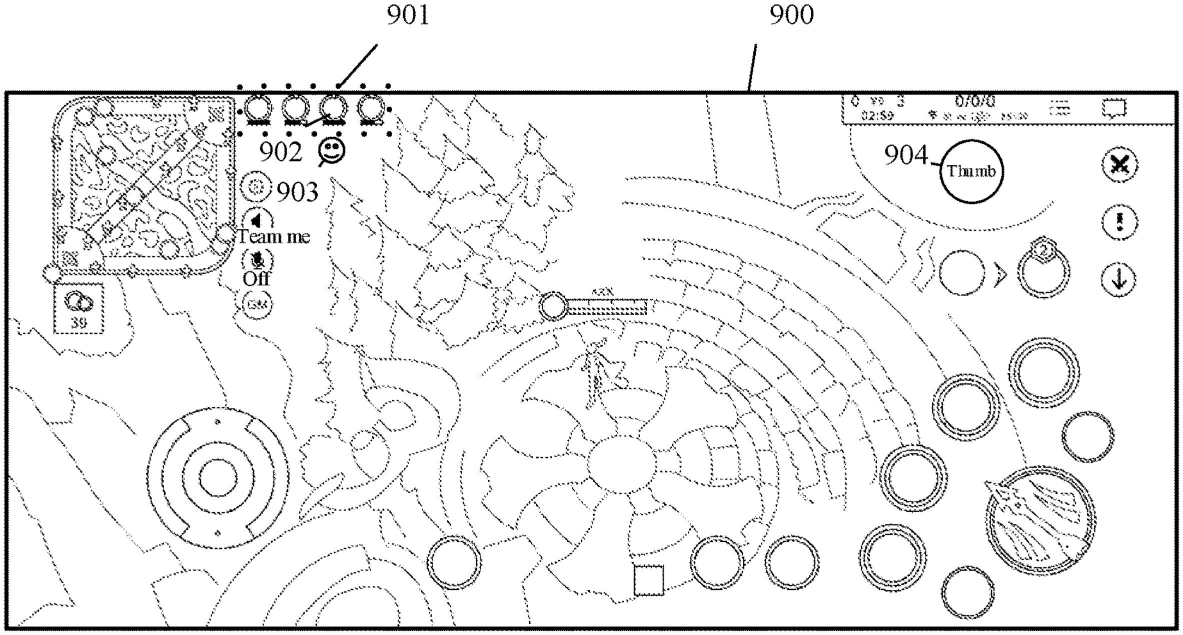
FIG. 9 is a schematic diagram of an interface according to certain embodiment(s) of the present disclosure.

For example, referring to FIG. 9, the first terminal displays avatars 901 of a plurality of virtual objects in a team in a virtual scene 900; and in response to the first interaction event happening in the virtual scene 900, the first terminal displays a first expression 903 corresponding to the first interaction event under an avatar 902 of the first virtual object.

In some embodiments, the first terminal displays the first expression in the upper right corner of the virtual scene such that the display of the first expression does not interfere with the user's view of the virtual scene and avoids the occlusion to the virtual scene by the first expression. For example, referring to FIG. 5, the first expression 501 in FIG. 5 is shown in the upper right corner of the virtual scene 500.

In some embodiments, a virtual map is displayed in the virtual scene, and the first terminal displays the first expression next to the virtual map. For example, the first terminal displays the first expression on the right side of the virtual map or displays the first expression below the virtual map. Since the virtual map is what the user frequently views during the game, displaying the first expression around the virtual map by the first terminal may increase the probability that the user sees the first expression. For example, referring to FIG. 5, the virtual scene 500 has a virtual map 502 displayed therein. The first terminal, in addition to displaying the first expression 501 on the upper right corner of the virtual scene 500, may display the first expression 501 on the right side or below the virtual map 502.

In some embodiments, after 402, the first terminal may perform the following steps 403 or 404 according to actual situations, which will not be limited in the embodiments of the present disclosure.

Step 403: The first terminal displays a second expression in the virtual scene in response to an operation for the first expression, the second expression being used for replying to the first expression.

In some embodiments, in response to a clicking operation for the first expression, the first terminal displays the second expression of the same type as the first expression in the virtual scene. In some embodiments, this mode of triggering the second expression is also referred to as "fast sending of expressions".

"The first terminal displays a second expression of the same type as the first expression in the virtual scene" means that in response to that the first expression is a "Cute" expression, the first terminal will also send a "Cute" expression after the user clicks on the first expression. In response to that the first expression is a "Smiley" expression, the first terminal will also send a "Smiley" expression after the user clicks on the first expression.

In this implementation, the user may directly click on the first expression to control the first terminal to display the second expression while wanting to reply to the first expression, without performing related operations such as expression selection, thereby achieving high efficiency of human-computer interaction.

Figure 10:
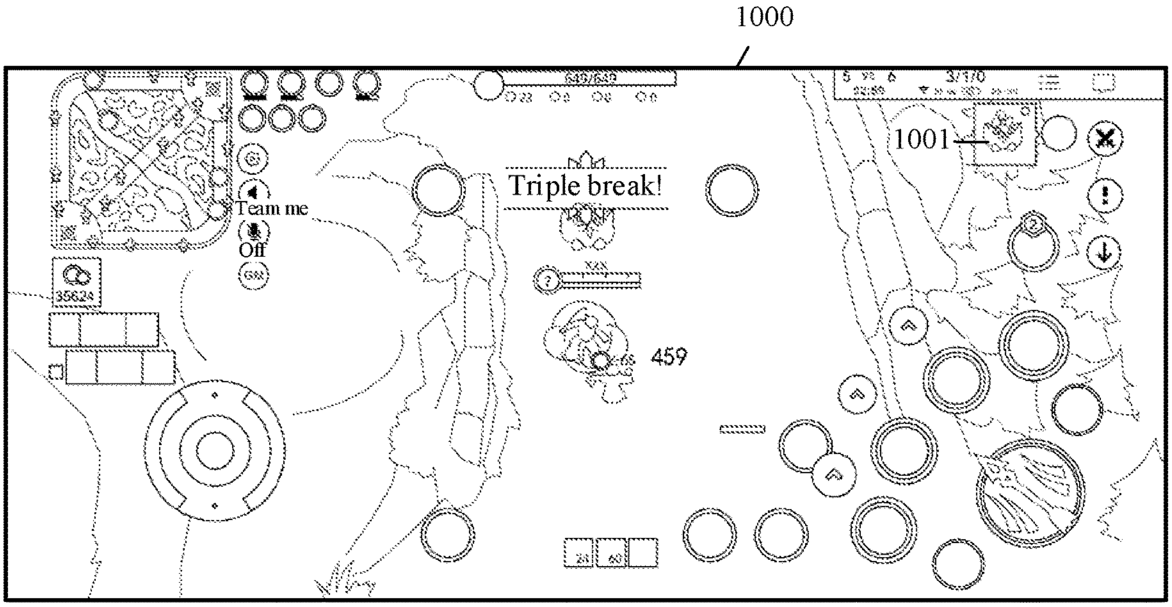
FIG. 10 is a schematic diagram of an interface according to certain embodiment(s) of the present disclosure.

For example, in response to a clicking operation on the first expression, the first terminal acquires a second expression of the same type as the first expression. The first terminal displays the second expression in the virtual scene. In some embodiments, the first terminal may also send a second request to the server in response to acquiring the second expression of the same type as the first expression, the second request carrying the second expression. The server acquires the second expression from the second request in response to receiving the second request, and the server sends a second instruction to the second terminal, the second instruction carrying the second expression. In response to receiving the second instruction, the second terminal acquires the second expression from the second instruction. The second terminal displays the second expression in the virtual scene. That is, while a user clicks on the first expression and controls the first terminal to display the second expression, other users belonging to the same team as the user may also see the second expression via the second terminal, so as to achieve a user-user interaction. The types of the first expression and the second expression are set by a person skilled in the art according to actual situations, which will not be limited in the embodiments of the present disclosure. For example, in response to that the first expression is an "Apology" expression, the person skilled in the art may bind a "Consolation" expression with the "Apology" expression; and in response to that the user clicks on the "Apology" expression, the first terminal may display the "Consolation" expression, while the first terminal sends the second request to the server, the second request carrying the "Consolation" expression. The server acquires the "Consolation" expression from the second request in response to receiving the second request, and the server sends the second instruction to the second terminal, the second instruction carrying the "Consolation" expression. In response to receiving the second instruction, the second terminal acquires the "Consolation" expression from the second instruction. The second terminal displays the "Consolation" expression in the virtual scene. The user who sends the "Apology" expression may also feel the encouragement from their teammates through the "Consolation" expression. For example, referring to FIG. 6, the first terminal displays the first expression 601 in the virtual scene 600; and in response to that the user clicks on the first expression 601, referring to FIG. 10, the first terminal may display a second expression 1001 in a virtual scene 1000.

In some embodiments, in response to a drag operation on the first expression, the first terminal displays an expression selection area in the virtual scene, the expression selection area having at least one candidate expression displayed therein. In response to a clicking operation on the second expression in the at least one candidate expression, the first terminal displays the second expression in the virtual scene.

In this implementation, the user may, in response to wanting to reply to the first expression, drag the first expression, and select the second expression that is desired to be sent in the displayed expression selection area, thereby giving the user greater autonomy and improving the user's gaming experience.

Figure 11:
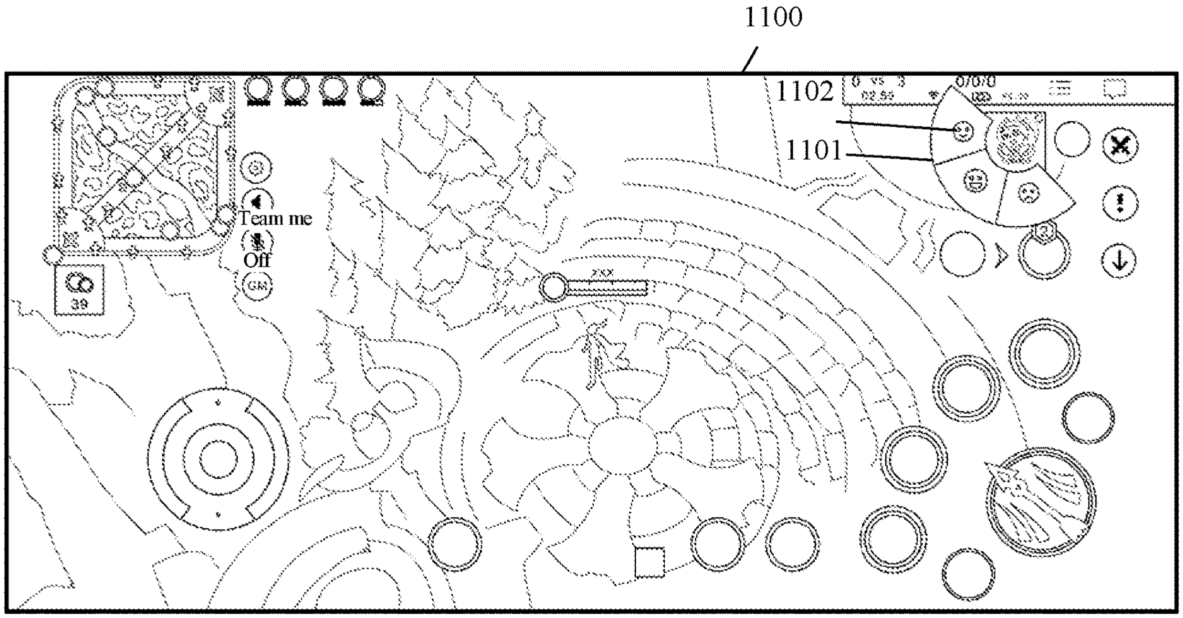
FIG. 11 is a schematic diagram of an interface according to certain embodiment(s) of the present disclosure.

For example, referring to FIG. 11, in response to the drag operation on the first expression, the first terminal displays an expression selection area 1101 in the virtual scene 1100, in which at least one candidate expression is displayed. In response to a clicking operation on a second expression 1102 in the at least one candidate expression, the first terminal displays the second expression 1102 in the virtual scene. In some embodiments, in response to a clicking operation on the second expression 1102 in the at least one candidate expression, the first terminal sends the second request to the server, the second request carrying the second expression. The server acquires the second expression from the second request in response to receiving the second request, and the server sends a second instruction to the second terminal, the second instruction carrying the second expression. In response to receiving the second instruction, the second terminal acquires the second expression from the second instruction. The second terminal displays the second expression in the virtual scene. That is, while a user clicks on the first expression and controls the first terminal to display the second expression, other users belonging to the same team as the user may also see the second expression via the second terminal, so as to achieve a user-user interaction.

The candidate expressions in the expression selection area are set by a person skilled in the art according to actual situations, which will not be limited in the embodiments of the present disclosure. For example, the person skilled in the art may configure an "Encouragement" expression, a "Smiley" expression and a "Sad" expression in the expression selection area, a user may select the second expression in the expression selection area to reply to the first expression, and the second expression selected by the user may also be seen by other users in the same team, so as to facilitate communication between users.

In some embodiments, the expression selection area includes a plurality of sub-areas, and the at least one candidate expression is displayed in the plurality of sub-areas, respectively. In this implementation, the terminal may display the at least one candidate expression in the plurality of sub-areas respectively, different sub-areas may separate the plurality of candidate expressions, and the user may select a desired candidate expression from the different sub-areas.

For example, the expression selection area is a circular area, one sub-area is a part of the circular area, and a type icon corresponding to the at least candidate expression is displayed in the center of the circular area. In some embodiments, the expression selection area is a rotatable area. In response to a sliding operation on the expression selection area, the first terminal controls the expression selection area to rotate in a direction of the sliding operation. That is, the user may view different candidate expressions by sliding the expression selection area. In the rotation process of the expression selection area, the candidate expression rotates accordingly, and the user may rotate the candidate expression to a desired position and then make an expression selection. In this scenario, the expression selection area is also referred to as an expression wheel. The type icons displayed in the center of the circular region are used to represent the types of the plurality of candidate expressions displayed in the sub-areas, and a user may determine the types of the plurality of candidate expressions by viewing the type icons.

In some embodiments, at least one expression type icon is displayed in the expression selection area, each expression type icon corresponding to at least one candidate expression. The first terminal displays a second expression corresponding to a target expression type icon in the virtual scene in response to a clicking operation on the target expression type icon in the at least one expression type icon. The expression type icon is also an icon representing the type of the corresponding expression. For example, the expression types include a "Consolation" expression, a "Smiley" expression, a "Sad" expression, etc. Taking the target expression type icon being an icon corresponding to the "Consolation" expression as an example, the first terminal displays the "Consolation" expression in the virtual scene in response to a clicking operation for the target expression type icon. It should be noted that the expression corresponding to the expression type icon is set by the user according to the preferences. For example, the user may set the expression corresponding to at least one expression type icon on the first terminal before the game starts; and in response to the completion of the setting, in response to that the user clicks on the corresponding expression type icon in the game, the first terminal may display the expression set by the user for the expression type icon, thereby enriching the user's selection and improving the user's game experience.

In some embodiments, the at least one candidate expression displayed in the expression selection area is an expression corresponding to the controlled virtual object. In response to the user clicking on the second expression in at least one candidate expression, the second expression displayed by the first terminal in the virtual scene is the expression corresponding to the controlled virtual object, and other users may know which user transmission side the second expression is from by viewing the second expression, thereby achieving extremely high efficiency of human-computer interaction. In some embodiments, in response to the clicking operation on the second expression in the at least one candidate expression, the first terminal is further capable of controlling the controlled virtual object to perform an action corresponding to the second expression in addition to displaying the second expression in the virtual scene. "Control" herein means to display. That is, the control process is performed by the server, and the first terminal displays the process of the controlled virtual object to perform the action, or the process of the controlled virtual object to perform the action is directly controlled by the first terminal, which will not be limited in the embodiments of the present disclosure. A corresponding relationship between the second expression and the action is set by a person skilled in the art according to actual situations. For example, the person skilled in the art may store the second expression and the corresponding action in a binding mode in response to completing the making of the second expression and the corresponding action; and in response to the second expression being selected, the first terminal controls the controlled virtual object to perform the action corresponding to the second expression. In this implementation, in addition to being able to display the second expression in the virtual scene, the first terminal is also able to control the controlled virtual object to perform a corresponding action, thereby enriching a display effect of the second expression and improving the user's game experience.

In some embodiments, in response to the operation on the first expression, the first terminal displays the second expression in the virtual scene in an zoomed-in manner. In some embodiments, the second expression is a vector graphic, and the first terminal may display the second expression in the zoomed-in manner in response to displaying the second expression, so as to facilitate the user to view.

For example, in response to the operation on the first expression, the first terminal determines the second expression corresponding to the operation, and the first terminal displays the second expression in the virtual scene in the zoomed-in manner. The first terminal may also send the second request to the server in response to determining the second expression corresponding to the operation, the second request carrying the second expression, so that the server sends the second instruction carrying the second expression to the second terminal. The second terminal displays the second expression in the virtual scene in the zoomed-in manner in response to receiving the second instruction.

In some embodiments, the terminal plays an animation corresponding to the second expression in the virtual scene in response to the operation on the first expression.

The animation corresponding to the second expression is configured by a person skilled in the art. For example, the person skilled in the art makes the expression and the animation corresponding to the expression well, and then stores the expression and the animation corresponding to the expression in a binding mode. In response to the operation on the first expression, the first terminal may directly load the animation corresponding to the second expression, and play the animation in the virtual scene.

For example, in response to the operation on the first expression, the first terminal determines the second expression corresponding to the operation, and the first terminal plays the animation corresponding to the second expression in the virtual scene. In response to the operation on the first expression, the first terminal is also capable of sending the second request to the server, the second request carrying the second expression, such that the server sends the second instruction carrying the second expression to the second terminal. The second terminal plays the animation corresponding to the second expression in the virtual scene in response to receiving the second instruction.

In some embodiments, the first terminal updates the first expression to the second expression in response to the operation on the first expression.

In this implementation, the first terminal only displays one expression at the same time, so as to avoid the occlusion on the virtual scene caused by a larger number of displayed expressions, thereby improving the user's game experience.

For example, in response to the operation on the first expression, the first terminal determines the second expression corresponding to the operation. The first terminal cancels the display of the first expression and displays the second expression on a display position of the first expression. In response to the operation on the first expression, the first terminal is also capable of sending the second request to the server, the second request carrying the second expression, such that the server sends the second instruction carrying the second expression to the second terminal. The second terminal updates the first expression to the second expression in the virtual scene in response to receiving the second instruction.

In some embodiments, the first terminal displays the second expression over the controlled virtual object.

In some embodiments, in response to that the first interaction event happens in the virtual scene, the first terminal displays an interaction control corresponding to the first expression in the virtual scene. In response to the operation on the interaction control, the first terminal displays the second expression in the virtual scene. In some embodiments, the first terminal simultaneously displays the first expression in the virtual scene.

The position of the interaction control is set by a person skilled in the art according to actual situations. For example, the interaction control is set at the lower right corner or the lower left corner of the virtual scene, which will not be limited in the embodiments of the present disclosure.

Referring to FIG. 9, in response to the first interaction event happening in the virtual scene 900, the first terminal displays a first expression 903 and an interaction control 904 corresponding to the first expression in a virtual scene 900. In response to the operation on the interaction control 904, the first terminal displays the second expression in the virtual scene 900.

In some embodiments, the first terminal displays an avatar of the controlled virtual object next to the second expression.

In this implementation, the user may quickly know that the second expression is the expression sent by the control terminal (i.e., the first terminal) of the controlled virtual object by viewing the avatar next to the second expression, thereby achieving high efficiency of human-computer interaction.

In some embodiments, avatars of a plurality of virtual objects in the same team as the controlled virtual object are displayed in the virtual scene, and the first terminal displays a corresponding second expression below the avatars of the plurality of virtual objects.

In this implementation, the user may quickly know which user sends the second expression by viewing the avatars above the second expression, thereby improving the efficiency of human-computer interaction.

In some embodiments, the first terminal cancels the display of the second expression in response to not detecting the operation on the second expression within a target duration.

Step 404: The first terminal cancels the display of the first expression in response to that no operation on the first expression is detected within the target duration.

The target duration is set by a person skilled in the art according to actual situations, such as being set as 2 s, 3 s or 5 s, which will not be limited in the embodiments of the present disclosure.

Through 404, in response to that no operation on the first expression is detected within the target duration, it means that the user does not want to reply to the first expression, and the first terminal may cancel the display of the first expression, without additionally occupying a display space of the virtual scene.

Step 405: The first terminal updates the second expression to a third expression corresponding to a second interaction event in response to that the second interaction event happens in the virtual scene, the second interaction event being an interaction event associated with a second virtual object, the second virtual object being a virtual object in the same team as the controlled virtual object.

The second interaction event is an interaction event which is the same as or different from the first interaction event. Accordingly, the second virtual object is a virtual object which is the same as or different from the first virtual object, which will not be limited in the embodiments of the present disclosure. In the following description, an example will be given in which the second virtual object and the first virtual object are different virtual objects. Accordingly, The second terminal described below is not a terminal the same as the second terminal in the previous step, the second terminal in 401-404 being a control terminal of the first virtual object, the second terminal in step 405 being a control terminal of the second virtual object.

In some embodiments, in response to that the control terminal of the second virtual object issues the third expression in the virtual scene, the first terminal updates the second expression to the third expression in the virtual scene, wherein the control terminal of the second virtual object issuing the third expression in the virtual scene is also one second interaction event, and the expression corresponding to the second interaction event is also the third expression.

In this implementation, in response to that the control terminal of the second virtual object issues the third expression in the virtual scene, the first terminal may display the third expression, so as to realize the communication between different users in the same team, thereby improving the efficiency of human-computer interaction.

For example, the second terminal displays a virtual scene, and the virtual scene displayed by the second terminal includes a virtual object controlled by the second terminal, namely, a second virtual object. In the game process, in response to that a user using the second terminal, i.e., the second user, wants to communicate with other users in the same team by sending expressions, the second user may trigger the expression sending operation in the virtual scene displayed on the second terminal. In response to the expression transmission operation, the second terminal sends a third request to the server, the third request carrying the third expression corresponding to the expression transmission operation. The server acquires the third expression from the third request in response to receiving the third request, and the server sends a third instruction to the first terminal, wherein the third instruction carrying the third expression. In response to receiving the third instruction, the first terminal acquires the third expression from the third instruction. The first terminal displays the third expression in the virtual scene.

In some embodiments, in response to the second virtual object triggering a target event in the virtual scene, the first terminal displays the third expression corresponding to the target event in the virtual scene.

For example, in response to the second virtual object triggering the target event in the virtual scene, the server sends the third instruction to the first terminal, the third instruction carrying the third expression corresponding to the target event. The first terminal receives the third instruction, then acquires the third expression from the third instruction, and displays the third expression in the virtual scene.

In some embodiments, in response to that the second virtual object is defeated in the virtual scene and the control terminal of the second virtual object issues the first expression in the virtual scene, the first terminal displays the third expression in the virtual scene.

The second virtual object being defeated in the virtual scene means that the life value of the second virtual object is reduced to zero. In some embodiments, the second virtual object may be defeated by the second virtual object in the virtual scene, may be defeated by a defense tower, or may be defeated by a virtual creature, which will not be limited in the embodiments of the present disclosure. In this implementation, the third expression is an expression of apology or frustration from a user controlling the second virtual object, i.e., the second user.

For example, the second terminal displays an expression sending control corresponding to the third expression in the virtual scene in response to that the second virtual object is defeated in the virtual scene. In response to a clicking operation on the expression sending control, the second terminal sends a third request to the server, the third request carrying the third expression. The server acquires the third expression from the third request in response to receiving the third request, and the server sends a third instruction to the first terminal, wherein the third instruction carrying the third expression. In response to receiving the third instruction, the first terminal acquires the third expression from the third instruction. The first terminal displays the third expression in the virtual scene.

Figure 12:
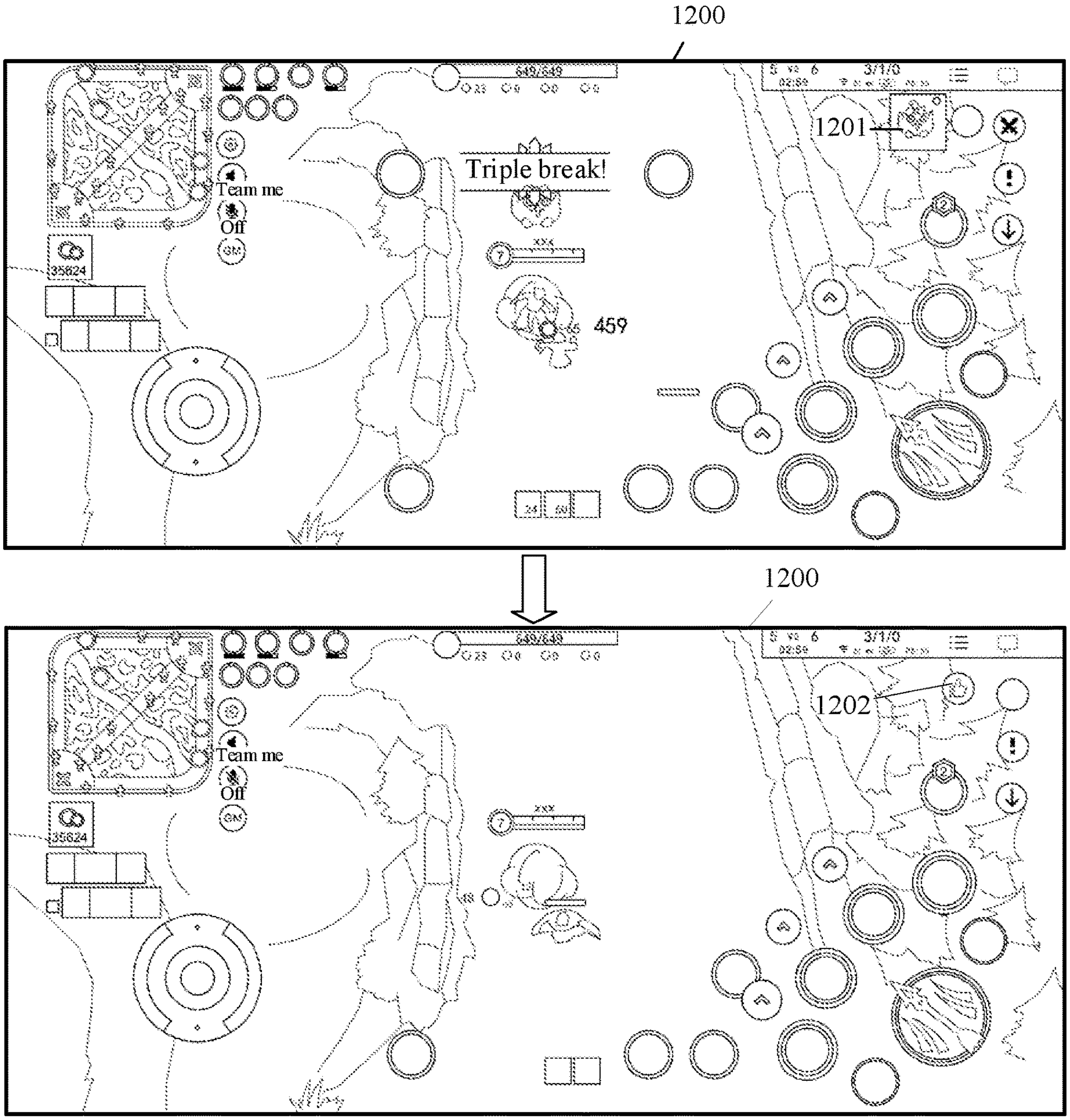
FIG. 12 is a schematic diagram of an interface according to certain embodiment(s) of the present disclosure.

For example, referring to FIG. 12, the first terminal displays a second expression 1201 in a virtual scene 1200; and in response to the second interaction event happening in the virtual scene 1200, the first terminal updates the second expression 1201 to a third expression 1202 corresponding to the second interaction event.

An embodiment of the present disclosure may be formed by using any combination of the technical solutions, and details are not described herein.

Figure 13:
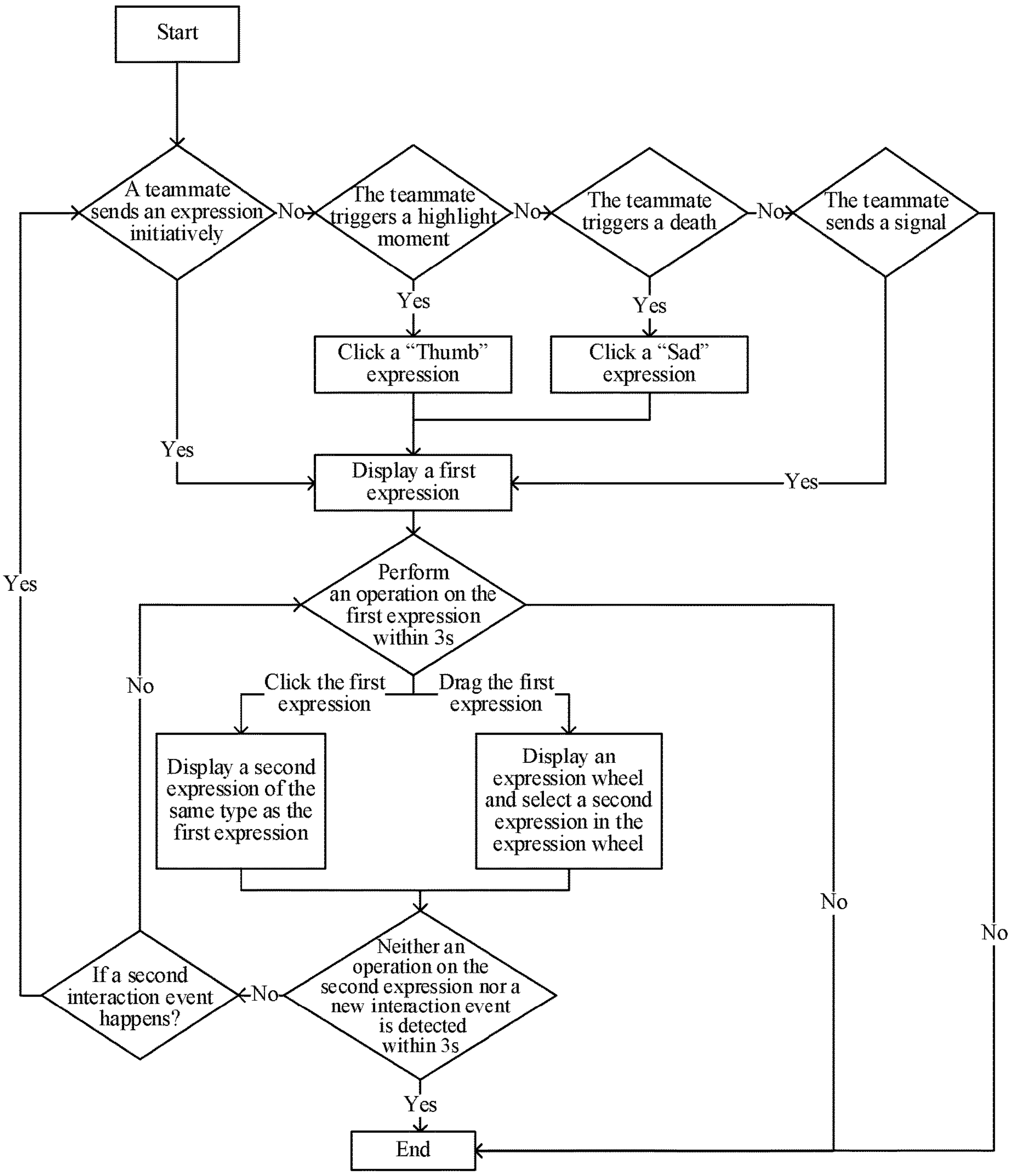
FIG. 13 is a logical block diagram of an expression display method in a virtual scene according to certain embodiment(s) of the present disclosure.

In order to more clearly illustrate the technical solutions provided by the embodiments of the present disclosure, reference will now be made to various implementations in 401-405 and to FIG. 13.

The first terminal displays the first expression corresponding to the first interaction event in the virtual scene in response to that the first interaction event happens in the virtual scene, the first interaction event includes: the control terminal of the first virtual object issues the first expression in the virtual scene; the first virtual object triggers the target event in the virtual scene, and the first virtual object is defeated in the virtual scene; and the control terminal of the first virtual object issues the first expression in the virtual scene. The control terminal of the first virtual object issuing the first expression in the virtual scene includes: a teammate actively sending an expression and a signal; the first virtual object triggering a target event in the virtual scene corresponding to the teammate triggering a highlight moment; and the first virtual object being defeated in the virtual scene corresponding to the teammate triggering a death. The first expression is operated within a target duration (3 s). In response to that the operation on the first expression is a clicking operation, the first terminal displays a second expression of the same type as the first expression. In response to that the operation on the first expression is a dragging operation, the first terminal displays an expression wheel, and selects the second expression in the expression wheel. In response to that no operation on the second expression is detected within the target duration (3 s) and no new interaction event is detected, the process ends. In response to that the second interaction event happens in the virtual scene, the above-mentioned steps are repeated.

Through the technical solutions provided by the embodiments of the present disclosure, during the game, the first expression corresponding to the first interaction time is displayed in the virtual scene in response to a teammate of the controlled virtual object triggering the first interaction event. In response to that a player wants to reply to the first expression, there may not be a need to open the chat box to select, and a response on the second expression may be made rapidly by performing the operation on the first expression directly, thereby achieving high efficiency of human-computer interaction.

Figure 14:
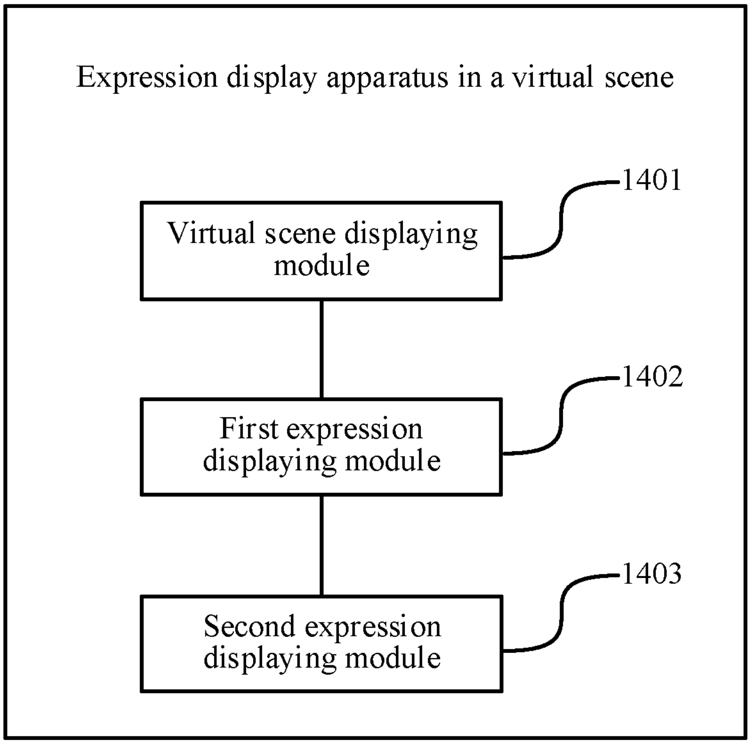
FIG. 14 is a schematic structural diagram of an expression display apparatus in a virtual scene according to certain embodiment(s) of the present disclosure.

FIG. 14 is a schematic structural diagram of an expression display apparatus in a virtual scene as provided by an embodiment of the present disclosure. Referring to FIG. 14, the apparatus includes: a virtual scene displaying module 1401, a first expression displaying module 1402 and a second expression displaying module 1403.

The virtual scene displaying module 1401 is configured to display a virtual scene, wherein a controlled virtual object is displayed in the virtual scene.

The first expression displaying module 1402 is configured to display a first expression corresponding to a first interaction event in the virtual scene in response to that the first interaction event happens in the virtual scene, the first interaction event being an interaction event associated with a first virtual object, the first virtual object being a virtual object in the same team as the controlled virtual object.

The second expression displaying module 1403 is configured to display a second expression in the virtual scene in response to the operation on the first expression, the second expression being used for replying to the first expression.

In some embodiments, the first expression displaying module 1402 is configured to perform any of the followings:

- in response to that a control terminal of the first virtual object issues the first expression in the virtual scene, displaying the first expression in the virtual scene;
- in response to that the first virtual object triggers a target event in the virtual scene, displaying the first expression corresponding to the target event in the virtual scene; and
- in response to that the first virtual object is defeated in the virtual scene and the control terminal of the first virtual object issues the first expression in the virtual scene, displaying the first expression in the virtual scene.

In some embodiments, the first expression displaying module 1402 is configured to play an animation corresponding to the first expression in the virtual scene.

In some embodiments, the apparatus further includes an avatar displaying module, configured to perform at least one of the followings:

- displaying an avatar of the first virtual object next to the first expression; and
- displaying an avatar of the controlled virtual object next to the second expression.

In some embodiments, the second expression displaying module 1403 is configured to perform any of the followings:

- displaying the second expression of the same type as the first expression in the virtual scene in response to a clicking operation on the first expression;
- displaying an expression selection area in the virtual scene in response to a dragging operation on the first expression, at least one candidate expression being displayed in the expression selection area; and displaying the second expression in the virtual scene in response to a clicking operation on the second expression in the at least one candidate expression.

In some embodiments, the second expression displaying module 1403 is configured to update the first expression to the second expression in response to the operation on the first expression In some embodiments, the second expression displaying module 1403 is further configured to display the second expression over the controlled virtual object.

In some embodiments, the apparatus further includes:

a third expression displaying module, configured to update the second expression to a third expression corresponding to a second interaction event in response to that the second interaction event happens in the virtual scene, the second interaction event being an interaction event associated with a second virtual object, the second virtual object being a virtual object in the same team as the controlled virtual object.

In some embodiments, avatars of a plurality of virtual objects in the team are displayed in the virtual scene; and the first expression displaying module 1402 is configured to display the first expression corresponding to the first interaction event under the avatar of the first virtual object in response to the first interaction event happening in the virtual scene.

In some embodiments, the second expression displaying module 1403 is further configured to display the corresponding second expression below the avatars of the plurality of virtual objects.

In some embodiments, the second expression displaying module 1403 is also configured to display an interaction control corresponding to the first expression in the virtual scene. The second expression is displayed in the virtual scene in response to the operation on the interaction control.

In some embodiments, the first expression displaying module 1402 is further configured to cancel the display of the first expression in response to not detecting the operation on the first expression within a target duration.

It should be noted that in response to that the expression display apparatus displays an expression in the virtual scene as provided by the above embodiment, only the partitioning of the above functional modules is used as an example. In certain embodiment(s), the functions may be allocated to be performed by different functional modules. That is, an internal structure of a computing device is partitioned into different functional modules to perform all or part of the functions described above. In addition, the expression display apparatus in the virtual scene as provided by the embodiment and the expression display method embodiment in the virtual scene belong to the same concept, and the implementation process is detailed in the method embodiments, which will not be repeated here.

Through the technical solutions provided by the embodiments of the present disclosure, during the game, the first expression corresponding to the first interaction time is displayed in the virtual scene in response to a teammate of the controlled virtual object triggering the first interaction event. In response to that a player wants to reply to the first expression, there may not be a need to open the chat box to select, and a response on the second expression may be made rapidly by performing the operation on the first expression directly, thereby achieving high efficiency of human-computer interaction.

An embodiment of the present disclosure provide a computing device for executing the above-mentioned method, wherein the computing device may be implemented as a terminal, and the structure of the terminal is described as follows.

Figure 15:
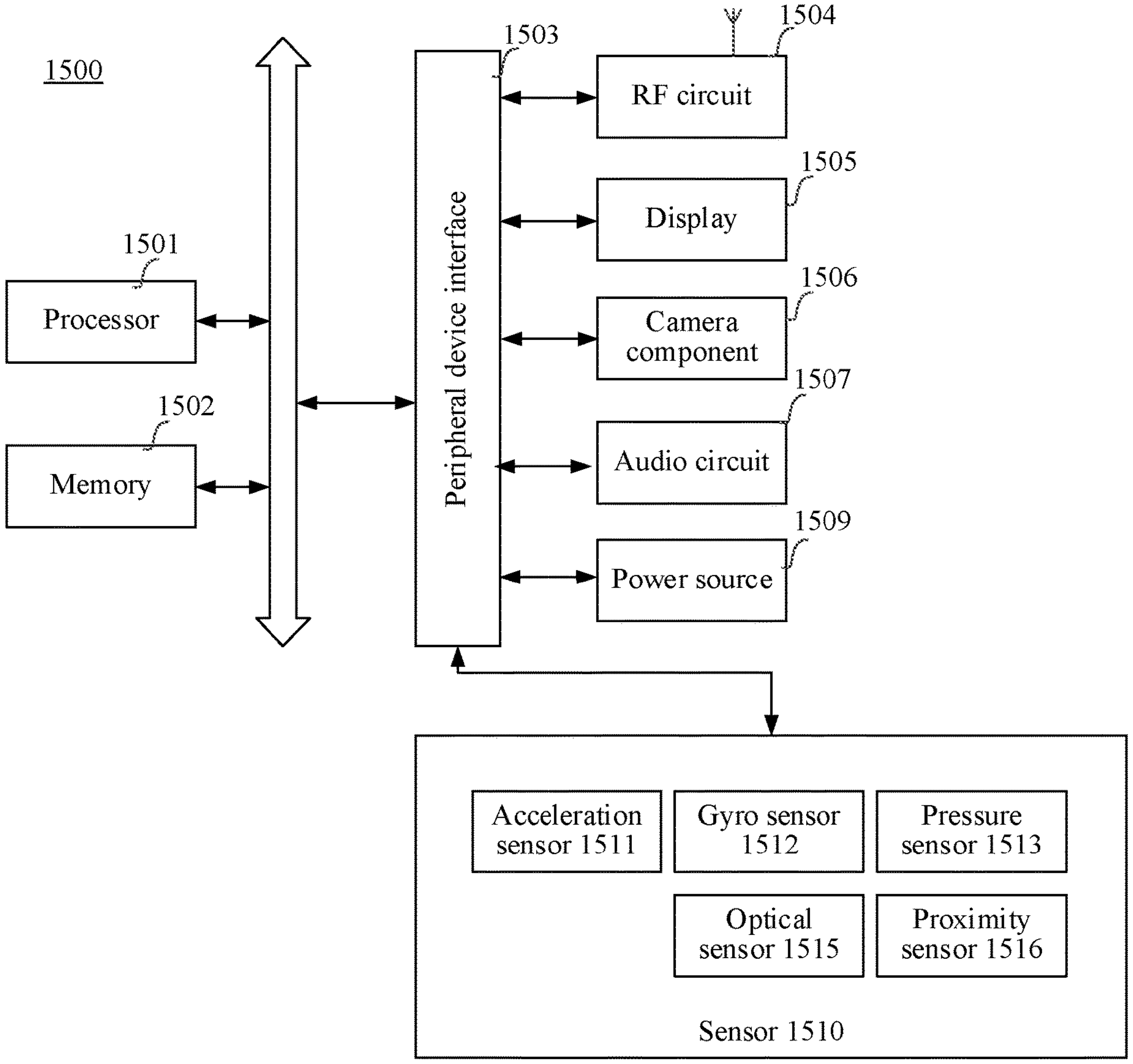
FIG. 15 is a schematic structural diagram of a terminal according to certain embodiment(s) of the present disclosure.

FIG. 15 is a schematic structural diagram of a terminal according to an embodiment of the present disclosure. The terminal 1500 may be: a smart phone, a tablet computer, a laptop or a desktop computer. The terminal 1500 may also be referred to as another name such as user equipment, a portable terminal, a laptop terminal, or a desktop terminal.

Generally, the terminal 1500 includes: one or more processors 1501 and one or more memories 1502.

The processor 1501 may include one or more processing cores, for example, a 4-core processor or an 8-core processor. The processor 1501 may be implemented in at least one hardware form of a digital signal processor (DSP), a field-programmable gate array (FPGA), and a programmable logic array (PLA). The processor 1501 may also include a main processor and a coprocessor. The main processor is a processor configured to process the data in an awake state, and is also called a central processing unit (CPU). The coprocessor is a low-power-consumption processor configured to process the data in a standby state. In some embodiments, the processor 1501 may be integrated with a graphics processing unit (GPU), which is configured to render and draw the content that is to be displayed by a display screen. In some embodiments, the processor 1501 may further include an artificial intelligence (AI) processor. The AI processor is configured to process computing operations related to machine learning.

The memory 1502 may include one or more computer-readable storage media. The computer-readable storage medium may be non-transient. The memory 1502 may further include a high-speed random access memory and a nonvolatile memory, for example, one or more disk storage devices or flash storage devices. In some embodiments, a non-transitory computer-readable storage medium in the memory 1502 is configured to store at least one computer program, which is performed by the processor 1501 to implement the expression display method in the virtual scene according to the method embodiment of the present disclosure.

In some embodiments, the terminal 1500 may further include: a peripheral device interface 1503 and at least one peripheral device. The processor 1501, the memory 1502, and the peripheral device interface 1503 may be connected by a bus or a signal line. Each peripheral device may be connected to the peripheral device interface 1503 by a bus, a signal line or a circuit board. In certain embodiment(s), the peripheral device includes at least one of an RF circuit 1504, a display screen 1505, a camera component 1506, an audio circuit 1507 and a power source 1509.

The peripheral device interface 1503 may be configured to connect the at least one peripheral device related to input/output (I/O) to the processor 1501 and the memory 1502. In some embodiments, the processor 1501, the memory 1502, and the peripheral device interface 1503 may be integrated on the same chip or circuit board. In some other embodiments, any one or two of the processor 1501, the memory 1502 and the peripheral device interface 1503 may be implemented on a separate chip or circuit board, which will not be limited in the present embodiment.

The RF circuit 1504 is configured to receive and send an RF signal, also referred to as an electromagnetic signal. The RF circuit 1504 communicates with a communication network and other communication devices through the electromagnetic signal. The RF circuit 1504 converts the electrical signal into the electromagnetic signal for transmission, or converts the received electromagnetic signal into the electrical signal. In certain embodiment(s), the RF circuit 1504 includes: an antenna system, an RF transceiver, one or more amplifiers, a tuner, an oscillator, a digital signal processor, a codec chipset, a subscriber identity module card, and the like.

The display screen 1505 is configured to display a user interface (UI). The UI may include a graph, text, an icon, a video, and any combination thereof. When the display screen 1505 is a touch display screen, the display screen 1505 also has the capacity to acquire touch signals on or over the surface of the display screen 1505. The touch signal may be inputted to the processor 1501 as a control signal for processing. At this time, the display screen 1505 may also be configured to provide virtual buttons and/or virtual keyboards, which are also referred to as soft buttons and/or soft keyboards.

The camera component 1506 is configured to capture images or videos. In certain embodiment(s), the camera component 1506 includes a front camera and a rear camera. Generally, the front-facing camera is disposed on the front panel of the terminal, and the rear-facing camera is disposed on a back surface of the terminal.

The audio circuit 1507 may include a microphone and a speaker. The microphone is configured to acquire sound waves of a user and an environment, and convert the sound waves into an electrical signal to input to the processor 1501 for processing, or input to the RF circuit 1504 for implementing voice communication.

The power source 1509 is configured to supply power to components in the terminal 1500. The power source 1509 may be alternating current, direct current, a disposable battery, or a rechargeable battery.

In some embodiments, the terminal 1500 also includes one or more sensors 1510. The one or more sensors 1510 include, but are not limited to: an acceleration sensor 1511, a gyro sensor 1512, a pressure sensor 1513, an optical sensor 1515 and a proximity sensor 1516.

The acceleration sensor 1511 may detect magnitudes of accelerations on three coordinate axes of a coordinate system established by the terminal 1500.

The gyro sensor 1512 may detect a body direction and a rotation angle of the terminal 1500, and may cooperate with the acceleration sensor 1511 to collect a 3D motion of the user on the terminal 1500.

The pressure sensor 1513 may be disposed on a side frame of the terminal 1500 and/or a lower layer of the touch display screen 1505. When the pressure sensor 1513 is disposed on the side frame of the terminal 1500, a user's holding signal to the terminal 1500 may be detected. The processor 1501 may perform left-right hand recognition or quick operation according to the holding signal collected by the pressure sensor 1513. When the pressure sensor 1513 is disposed on the lower layer of the touch display screen 1505, the processor 1501 controls an operable control on the UI according to a user's pressure operation on the touch display screen 1505.

The optical sensor 1515 is configured to acquire ambient light intensity. In one embodiment, the processor 1501 may control the display brightness of the touch display screen 1505 according to the ambient light intensity collected by the optical sensor 1515.

The proximity sensor 1516 is configured to capture a distance between the user and a front surface of the terminal 1500.

It will be understood by those skilled in the art that the structure shown in FIG. 15 does not constitute a limitation to the terminal 1500, and may include more or less components than those illustrated, or combine some components or adopt different component arrangements.

In some embodiments of the present disclosure, a computer-readable storage medium, such as a memory including a program, is provided, which may be performed by a processor to perform the expression display method in the virtual scene involved in the above embodiments. For example, the computer-readable storage medium may be a read-only memory (ROM), a random access memory (RAM), a compact disc read-only memory (CD-ROM), a magnetic tape, a floppy disk, an optical data storage devices, etc.

In an embodiment of the present disclosure, a computer program product or a computer program is further provided. The computer program product or the computer program includes program codes, which are stored in a computer-readable storage medium. A processor of the computing device reads the program codes from the computer-readable storage medium, and the processor executes the program codes, causing the computing device to perform the expression display method in the virtual scene.

In some embodiments, a computer program involved in the embodiments of the present disclosure may be deployed on one computer program, or performed on a plurality of computing devices located at one site, or performed on a plurality of computing devices distributed at a plurality of locations and interconnected by a communication network. The plurality of computing devices distributed at a plurality of locations and interconnected by the communication network may form a blockchain system.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit may be implemented using one or more processors (or processors and memory). Likewise, a processor (or processors and memory) may be used to implement one or more units. Moreover, each unit may be part of an overall unit that includes the functionalities of the unit.

It may be understood by a person of ordinary skill in the art that all or part of steps in the above embodiments may be performed by hardware, or a program instructing relevant hardware. The program may be stored in a computer-readable storage medium which includes a read-only memory, a magnetic disk, an optical disc or the like.

The descriptions are merely embodiments of the present disclosure, and are not intended to limit the present disclosure. Within the spirit and principles of the present disclosure, any modifications, equivalent substitutions, improvements, etc., are within the protection scope of the present disclosure.

What is claimed is:

1. An expression display method in a virtual scene, the method comprising:

displaying a virtual scene with a controlled virtual object displayed in the virtual scene;

displaying a first expression corresponding to a first interaction event in the virtual scene in response to the first interaction event happening in the virtual scene, the first interaction event being an interaction event associated with a first virtual object, the first virtual object being a virtual object in the same team as the controlled virtual object; and displaying a second expression in the virtual scene in response to an operation on the first expression, the second expression being used for replying to the first expression, the operation on the first expression being performed directly on the first expression in the virtual scene and without opening a new chat window for expression selection, wherein the operation on the first expression comprises a clicking operation on the first expression, and the second expression is of the same type as the first expression in response to the operation on the first expression comprising the clicking operation on the first expression.

2. The method according to claim 1, wherein displaying the first expression comprises one or more of:

displaying the first expression in the virtual scene in response to a control terminal of the first virtual object issuing the first expression in the virtual scene;

displaying the first expression corresponding to a target event in the virtual scene in response to the first virtual object triggering the target event in the virtual scene; or displaying the first expression in the virtual scene in response to the first virtual object being defeated in the virtual scene and the control terminal of the first virtual object issuing the first expression in the virtual scene.

3. The method according to claim 1, wherein displaying the first expression comprises:

playing an animation corresponding to the first expression in the virtual scene.

4. The method according to claim 1, further comprising one or both of:

displaying an avatar of the first virtual object next to the first expression; and displaying an avatar of the controlled virtual object next to the second expression.

5. The method according to claim 1, wherein displaying the second expression further comprises:

displaying an expression selection area in the virtual scene in response to a dragging operation on the first expression, at least one candidate expression being displayed in the expression selection area; and displaying the second expression in the virtual scene in response to a clicking operation on the second expression in the at least one candidate expression.

6. The method according to claim 1, wherein displaying the second expression comprises:

updating the first expression to the second expression in response to the operation on the first expression.

7. The method according to claim 1, wherein displaying the second expression comprises:

updating the first expression to the second expression in response to the operation on the first expression.

8. The method according to claim 1, further comprising:

updating the second expression to a third expression corresponding to a second interaction event in response to the second interaction event happening in the virtual scene, the second interaction event being an interaction event associated with a second virtual object, the second virtual object being a virtual object in the same team as the controlled virtual object.

9. The method according to claim 1, wherein avatars of a plurality of virtual objects in the team are displayed in the virtual scene, and displaying the first expression comprises:

displaying the first expression corresponding to the first interaction event below the avatar of the first virtual object in response to the first interaction event happening in the virtual scene.

10. The method according to claim 9, further comprising:

displaying the corresponding second expression below the avatars of the plurality of virtual objects.

11. The method according to claim 1, further comprising:

displaying an interaction control corresponding to the first expression in the virtual scene; and displaying the second expression in the virtual scene in response to an operation on the interaction control.

12. The method according to claim 1, further comprising:

canceling the display of the first expression in response to no operation on the first expression being detected within a target duration.

13. The method according to claim 1, further comprising:

in response to the operation on the first expression, controlling the controlled virtual object to perform an action corresponding to the second expression in the virtual scene.

14. An expression display apparatus in a virtual scene, comprising: a memory storing computer program instructions; and a processor coupled to the memory and configured to execute the computer program instructions and perform:

displaying a virtual scene with a controlled virtual object displayed in the virtual scene;

displaying a first expression corresponding to a first interaction event in the virtual scene in response to the first interaction event happening in the virtual scene, the first interaction event being an interaction event associated with a first virtual object, the first virtual object being a virtual object in the same team as the controlled virtual object; and displaying a second expression in the virtual scene in response to an operation on the first expression, the second expression being used for replying to the first expression, the operation on the first expression being performed directly on the first expression in the virtual scene and without opening a new chat window for expression selection, wherein the operation on the first expression comprises a clicking operation on the first expression, and the second expression is of the same type as the first expression in response to the operation on the first expression comprising the clicking operation on the first expression.

15. The apparatus according to claim 14, wherein displaying the first expression includes one or more of:

displaying the first expression in the virtual scene in response to a control terminal of the first virtual object issuing the first expression in the virtual scene;

displaying the first expression corresponding to a target event in the virtual scene in response to the first virtual object triggering the target event in the virtual scene; or displaying the first expression in the virtual scene in response to the first virtual object being defeated in the virtual scene and the control terminal of the first virtual object issuing the first expression in the virtual scene.

16. The apparatus according to claim 14, wherein displaying the first expression includes:

playing an animation corresponding to the first expression in the virtual scene.

17. The apparatus according to claim 14, wherein the processor is further configured to execute the computer program instructions and perform one or both of:

displaying an avatar of the first virtual object next to the first expression; and displaying an avatar of the controlled virtual object next to the second expression.

18. The apparatus according to claim 14, wherein displaying the second expression further includes:

displaying an expression selection area in the virtual scene in response to a dragging operation on the first expression, at least one candidate expression being displayed in the expression selection area; and displaying the second expression in the virtual scene in response to a clicking operation on the second expression in the at least one candidate expression.

19. The apparatus according to claim 14, wherein displaying the second expression includes:

updating the first expression to the second expression in response to the operation on the first expression.

20. A non-transitory computer-readable storage medium storing computer program instructions executable by at least one processor to perform:

displaying a virtual scene with a controlled virtual object displayed in the virtual scene;

displaying a first expression corresponding to a first interaction event in the virtual scene in response to the first interaction event happening in the virtual scene, the first interaction event being an interaction event associated with a first virtual object, the first virtual object being a virtual object in the same team as the controlled virtual object; and displaying a second expression in the virtual scene in response to an operation on the first expression, the second expression being used for replying to the first expression, the operation on the first expression being performed directly on the first expression in the virtual scene and without opening a new chat window for expression selection, wherein the operation on the first expression comprises a clicking operation on the first expression, and the second expression is of the same type as the first expression in response to the operation on the first expression comprising the clicking operation on the first expression.

* * * * *